United States Patent [19]

Ver Strate et al.

[11] Patent Number: 4,900,461

[45] Date of Patent: Feb. 13, 1990

[54] VISCOSITY MODIFIER POLYMERS (E-98)

[75] Inventors: Gary Ver Strate, Atlantic Highlands; Ricardo Bloch, Scotch Plains; Mark J. Struglinski, Bridgewater; John E. Johnston, Westfield; Roger K. West, Montclair, all of N.J.

[73] Assignee: Exxon Chemical Patents Inc., Linden, N.J.

[21] Appl. No.: 194,431

[22] Filed: May 13, 1988

Related U.S. Application Data

[63] Continuation of Ser. No. 72,825, Jul. 13, 1988, Pat. No. 4,804,794.

[51] Int. Cl.$^4$ .............. C10M 161/00; C10M 133/16
[52] U.S. Cl. .............. 252/49.6; 252/51.5 A; 252/51.5 R; 252/50; 252/56 R; 252/56 D
[58] Field of Search .............. 252/49.6, 51.5 A, 56 P, 252/56 D

[56] References Cited

U.S. PATENT DOCUMENTS

| | | | |
|---|---|---|---|
| 3,035,040 | 6/1962 | Findlay | 260/94.9 |
| 3,162,620 | 12/1964 | Gladding | 260/80.5 |
| 3,378,606 | 4/1968 | Kontos | 260/878 |
| 3,380,978 | 4/1968 | Ryan et al. | 260/88.2 |
| 3,389,087 | 6/1963 | Kresge et al. | 252/59 |
| 3,522,180 | 7/1970 | Sweeney et al. | 252/59 |
| 3,551,336 | 12/1970 | Jacobson et al. | 252/59 |
| 3,625,658 | 12/1971 | Closon | 23/285 |
| 3,681,306 | 8/1972 | Wehner | 260/80.78 |
| 3,691,078 | 9/1972 | Johnston et al. | 252/59 |
| 3,697,429 | 10/1972 | Engel et al. | 252/59 |
| 3,798,288 | 3/1974 | McManimie et al. | 260/878 |
| 3,879,494 | 4/1975 | Milkovitch et al. | 260/876 |
| 4,065,520 | 12/1977 | Bailey et al. | 260/878 |
| 4,135,044 | 1/1979 | Beals | 526/64 |
| 4,254,237 | 3/1981 | Shiga et al. | 525/323 |
| 4,337,326 | 6/1982 | Shiga et al. | 525/244 |
| 4,414,369 | 11/1983 | Kuroda et al. | 526/65 |
| 4,480,075 | 10/1984 | Willis | 525/247 |
| 4,499,242 | 2/1985 | Loontjens | 525/289 |
| 4,505,834 | 3/1985 | Papay et al. | 252/51.5 A |
| 4,507,515 | 3/1985 | Johnston et al. | 585/12 |
| 4,540,753 | 9/1985 | Cozewith et al. | 526/88 |
| 4,575,574 | 3/1986 | Kresge et al. | 585/520 |
| 4,620,048 | 10/1986 | VerStrate et al. | 585/10 |
| 4,735,736 | 4/1988 | Chung | 252/51.5 A |
| 4,749,505 | 6/1988 | Chung et al. | 252/51.5 A |

FOREIGN PATENT DOCUMENTS 59034 1/1982 European Pat. Off. .
60609 9/1982 European Pat. Off. .

OTHER PUBLICATIONS

Y. Doi et al., "Block Copolymerization of Propylene and Ethylene with the 'Living' Coordination Catalyst V(acac)3/Al(C$_2$H$_5$)$_2$Cl/Anisole", pp. 225–229, Makromol. Chem. Rapid Commun. vol. 3 (1982).

G. C. Evans, "'Living' Coordination Polymerization", 1981 Michigan Molecular Instit. on Transition Metal Catalyzed Polymerizations: Unsolved Problems, pp. 245–265 (1961).

E. Junghanns et al., "Polymerization of Ethylene and Propylene to Amorphous Copolymers with Catalysts of Vanadium Oxychloride and Alkyl Aluminum Halides"; Makromol Chem., v. 58 (12/62) 18–42.

Y. Mitsuda et al., "Estimation of Long-Chain Branching in Ethylene–Propylene Terpolymers from Infinite-Dilution Viscoelastic Properties"; J. Appl. Pol. Sci., 18, 193 (1974).

C. K. Shih, "The Effect of Molecular Weight and Molecular Weight Distribution on the Non-Newtonian Behavior of Ethylene–Propylene Diene Polymers"; Trans. Soc. Rheol., 14 83 (1970).

J. F. Wehner, "Laminar Flow Polymerization of EPDM Polymer"; ACS Symposium Series 65, pp. 140–152.

Primary Examiner—Jacqueline V. Howard
Attorney, Agent, or Firm—J. B. Murray, Jr.; M. B. Kapustij

[57] ABSTRACT

The present invention relates to novel copolymers of alpha-olefins comprised of intramolecularly heterogeneous and intermolecularly homogeneous copolymer chains.

90 Claims, 17 Drawing Sheets (COPOLYMER 3-2)

(COPOLYMER 3-3)

(COPOLYMER 3-4)

(COPOLYMER 3-5)

(COPOLYMER 3-6)

FIG. 14 (COPOLYMER 4-1)

(COPOLYMER 4-2)

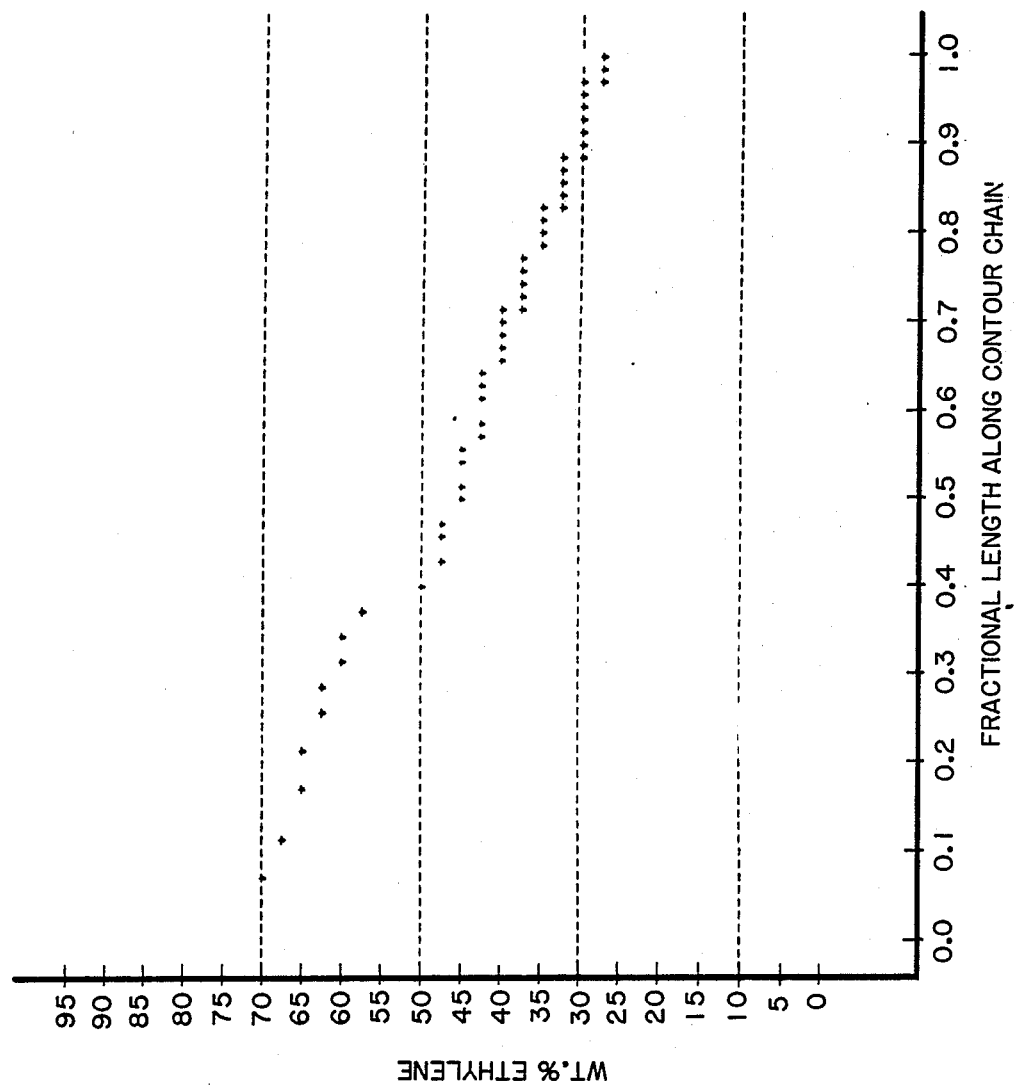

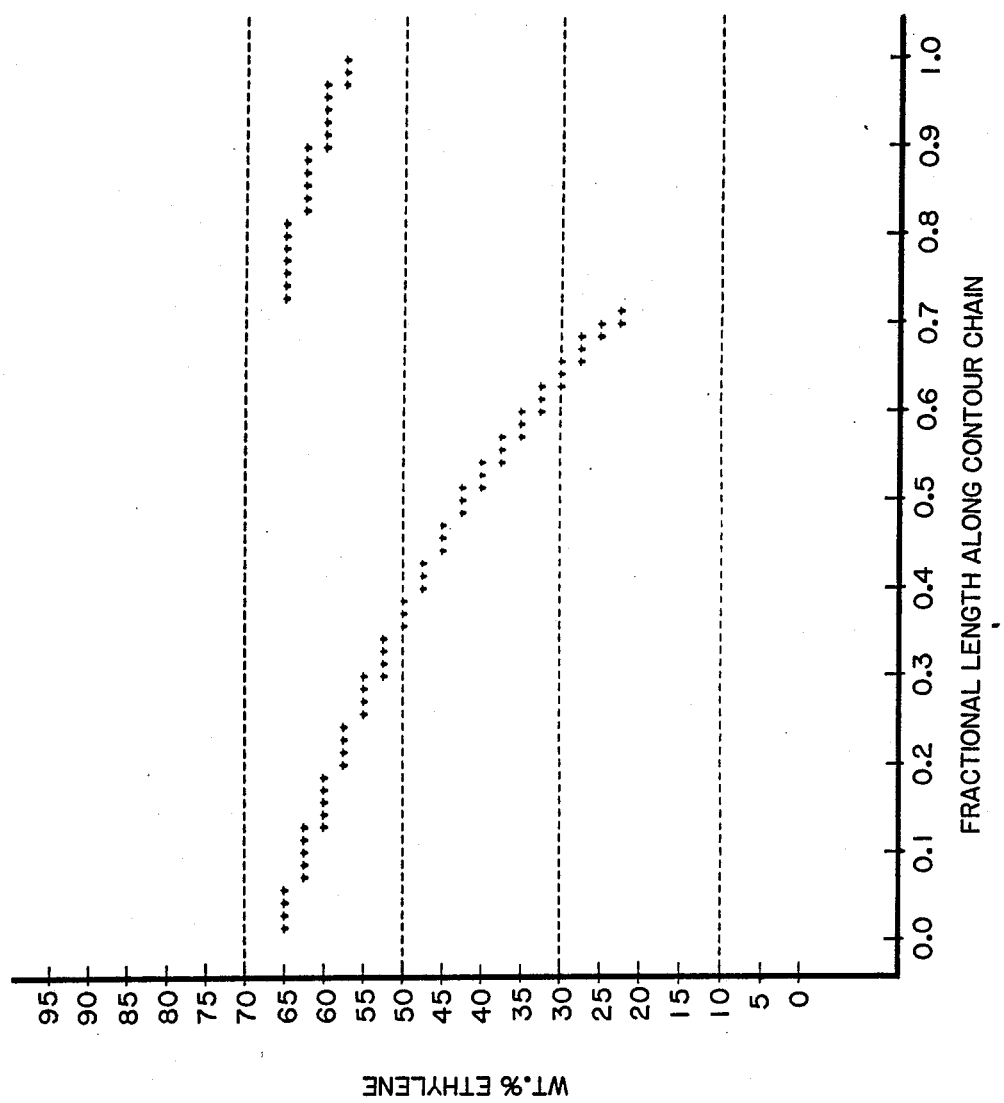

VISCOSITY MODIFIER POLYMERS (E-98)

This is a continuation, of application Ser. No. 072,825, filed 7/13/88, now U.S. Pat. No. 4,804,794.

BACKGROUND OF THE INVENTION

The present invention relates to novel copolymers of alpha-olefins. More specifically, it relates to novel copolymers of ethylene with other alpha-olefins comprised of segmented copolymer chains with compositions which are intramolecularly heterogeneous and intermolecularly homogeneous, as well as to a process for making these copolymers and their use in lube oil applications.

For convenience, certain terms that are repeated throughout the present specification are defined below:

a. Inter-CD defines the compositional variation, in terms of ethylene content, among polymer chains. It is expressed as the minimum deviation (analogous to a standard deviation) in terms of weight percent ethylene, from the average ethylene composition for a given copolymer sample needed to include a given weight percent of the total copolymer sample, which is obtained by excluding equal weight fractions from both ends of the distribution. The deviation need not be symmetrical. When expressed as a single number, for example 15% Inter-CD, it shall mean the larger of the positive or negative deviations. For example, for a Gaussian compositional distribution, 95.5% of the polymer is within 20 wt. % ethylene of the mean if the standard deviation is 10%. The Inter-CD for 95.5 wt. % of the polymer is 20 wt. % ethylene for such a sample.

b. Intra-CD is the compositional variation, in terms of ethylene, within a copolymer chain. It is expressed as the minimum difference in weight (wt.) % ethylene that exists between two portions of a single copolymer chain, each portion comprising at least 5 weight % of the chain.

c. Molecular weight distribution (MWD) is a measure of the range of molecular weights within a given copolymer sample. It is characterized in terms of at least one of the ratios of weight-average to number-average molecular weight, $\overline{M}_w/\overline{M}_n$, and Z-average to weight-average molecular weight, $\overline{M}_z/\overline{M}_w$, where:

$$\overline{M}_w = \frac{\Sigma N_i M_i^2}{\Sigma N_i M_i}$$

$$\overline{M}_n = \frac{\Sigma N_i M_i}{\Sigma N_i}, \text{ and}$$

$$\overline{M}_z = \frac{\Sigma N_i M_i^3}{\Sigma N_i M_i^2},$$

wherein $N_i$ is the number of molecules of molecular weight $M_i$.

d. Viscosity Index (V.I.) is the ability of a lubricating oil to accommodate increases in temperature with a minimum decrease in viscosity. The greater this ability, the higher the V.I.

Ethylene-propylene copolymers, particularly elastomers, are important commercial products, and are widely used as viscosity modifiers (VM) in lubricating oils. There exists a continuing need for discovering polymers with unique properties and compositions for use as viscosity modifiers for lubricating oils.

A motor oil should not be too viscous at low temperatures so as to avoid serious frictional losses, facilitate cold starting and provide free oil circulation right from engine startup. On the other hand, it should not be too thin at working temperatures so as to avoid excessive engine wear and excessive oil consumption. It is most desirable to employ a lubricating oil which experiences the least viscosity change with changes in temperature.

Polymeric additives have been extensively used in lubricating oil compositions to impart desirable viscosity-temperature characteristics to the compositions. For example, lubricating oil compositions which use ethylene-propylene copolymers (EPM) or ethylene-propylene-non-conjugated diene terpolymers (EPDM) or, more generally, ethylene-($C_3$–$C_{18}$ alpha-olefin copolymers, as V.I. improvers are well known. These additives are designed to permit lubricating oil formulation so that changes in viscosity occurring with variations in temperature are kept as small as possible. Lubricating oils containing such polymeric additives tend to maintain their viscosity at high temperature while at the same time maintaining desirable low viscosity at engine starting temperatures.

Two important properties (although not the only required properties as is known) of these additives relate to low temperature performance and shear stability. Low temperature performance relates to maintaining low viscosity at very low temperatures, while shear stability relates to the resistance of the polymeric additives to being broken down into smaller chains when subjected to mechanical stress in an engine.

In "Polymerization of ethylene and propylene to amorphous copolymers with catalysts of vanadium oxychloride and alkyl aluminum halides"; E. Junghanns, A. Gumboldt and G. Bier; Makromol. Chem., v. 58 (12/12/62): 18–42 the use of a tubular reactor to produce ethylene-propylene copolymer is disclosed in which the composition varies along the chain length. More specifically, this reference discloses the production in a tubular reactor of amorphous ethylene-propylene copolymers using Ziegler catalysts prepared from a vanadium compound and aluminum alkyl. It is disclosed that at the beginning of the tube ethylene is preferentially polymerized, and if no additional make-up of the monomer mixture is made during the polymerization the concentration of monomers changes in favor of propylene along the tube. It is further disclosed that since these changes in concentrations take place during chain propagation, copolymer chains are produced which contain more ethylene on one end than at the other end. It is also disclosed that copolymers made in a tube are chemically non-uniform, but fairly uniform as regards molecular weight distribution. Using the data reported in their FIG. 17 for copolymer prepared in the tube it was estimated that the $\overline{M}_w/\overline{M}_n$ ratio for this copolymer was 1.6, and from their FIG. 18, that the intermolecular compositional dispersity (Inter-CD, explained in detail below) of this copolymer was greater than 15%.

J. F. Wehner, "Laminar Flow Polymerization of EPDM Polymer", *ACS Symposium Series* 65, pp. 140–152 (1978) discloses the results of computer simulation work undertaken to determine the effect of tubular reactor solution polymerization with Ziegler catalysts on the molecular weight distribution of the polymer product. The specific polymer simulated was an elastomeric terpolymer of ethylene-propylene-1,4-hexadiene. On page 149, it is stated that since the monomers have different reactivities, a polymer of varying composition is obtained as the monomers are depleted. However, whether the composition varies inter-or intramolecularly is not distinguished. In Table III on page 148, various polymers having $\overline{M}_w/\overline{M}_n$ of about 1.3 are predicted. In the third paragraph on page 144, it is stated that as the tube diameter increases, the polymer molecular weight is too low to be of practical interest, and it is predicted that the reactor will plug. It is implied in the first paragraph on page 149 that the compositional dispersity produced in a tube would be detrimental to product quality.

U.S. Pat. No. 3,681,306 to Wehner is drawn to a process for producing ethylene/higher alpha-olefin copolymers having good processability, by polymerization in at least two consecutive reactor stages. According to this reference, this two-stage process provides a simple polymerization process that permits tailor-making ethylene/alpha-olefin copolymers having predetermined properties, particularly those contributing to processability in commercial applications such as cold-flow, high green strength and millability. According to this reference, the inventive process is particularly adapted for producing elastomeric copolymers, such as ethylene/propylene/5-ethylidene-2-norbornene, using any of the coordination catalysts useful for making EPDM. The preferred process uses one tubular reactor followed by one pot reactor. However, it is also disclosed that one tubular reactor could be used, but operated at different reaction conditions to simulate two stages. As is seen from column 2, lines 14–20, the inventive process makes polymers of broader MWD than those made in a single stage reactor. Although intermediate polymer from the first (pipeline) reactor is disclosed as having a ratio of $\overline{M}_w/\overline{M}_n$ of about 2, as disclosed in column 5, lines 54–57, the final polymers produced by the inventive process have an $\overline{M}_w/\overline{M}_n$ of 2.4 to 5.

U.S. Pat. No. 3,625,658 to Closon discloses a closed circuit tubular reactor apparatus with high recirculation rates of the reactants which can be used to make elastomers of ethylene and propylene. With particular reference to FIG. 1, a hinged support 10 for vertical leg 1 of the reactor allows for horizontal expansion of the bottom leg thereof and prevents harmful deformations due to thermal expansions, particularly those experienced during reactor clean out.

U.S. Pat. No. 4,065,520 to Bailey et al. discloses the use of a batch reactor to make ethylene copolymers, including elastomers, having broad compositional distributions. Several feed tanks for the reactor are arranged in series, with the feed to each being varied to make the polymer. The products made have crystalline to semi-crystalline to amorphous regions and gradient changes in between. The catalyst system can use vanadium compounds alone or in combination with titanium compound and is exemplified by vanadium oxy-tri-chloride and diisobutyl aluminum chloride. In all examples titanium compounds are used. In several examples hydrogen and diethyl zinc, known transfer agents, are used. The polymer chains produced have a compositionally disperse first length and uniform second length. Subsequent lengths have various other compositional distributions.

In "Estimation of Long-Chain Branching in Ethylene-Propylene Terpolymers from Infinite-Dilution Viscoelastic Properties"; Y. Mitsuda, J. Schrag, and J. Ferry; *J. Appl. Pol. Sci.*, 18, 193 (1974) narrow MWD copolymers of ethylene-propylene are disclosed. For example, in Table II on page 198, EPDM copolymers are disclosed which have $\overline{M}_w/\overline{M}_n$ of from 1.19 to 1.32.

In "The Effect of Molecular Weight and Molecular Weight Distribution on the Non-Newtonian Behavior of Ethylene-Propylene-Diene Polymers"; *Trans. Soc. Rheol.*, 14, 83 (1970); C. K. Shih, a whole series of compositionally homogenous fractions were prepared and disclosed. For example, the data in Table I discloses polymer Sample B having a high degree of homogeneity. Also, based on the reported data, the MWD of the sample is very narrow. However, the polymers are not disclosed as having intramolecular dispersity.

U.S. Pat. No. 4,540,753 to Cozewith et al. relates to narrow molecular weight distribution copolymers of ethylene and at least one other alpha-olefin monomer which copolymer is intramolecularly heterogeneous and intermolecularly homogeneous. The copolymers are disclosed to be useful in lubricating oils as viscosity index improvers. The MWD of the copolymers are characterized by at least one of $\overline{M}_w/\overline{M}_n$ of less than 2 and $\overline{M}_z/\overline{M}_w$ of less than 1.8. The copolymers are preferably made in a tubular reactor, and the patentee discloses that various copolymer structures can be prepared by adding additional monomer(s) during the course of the polymerization. In FIG. 4 thereof (wherein wt. % ethylene at a point on the chain contour versus fractional length along chain contour is plotted), a series of polymer contours are depicted, employing multiple feeds of ethylene along the tube in a tubular reactor.

U.S. Pat. No. 4,135,044 to Beals relates to production of polyethylene by polymerization of ethylene alone or with comonomers and/or telogens in an elongated tubular reactor having an inlet and outlet and a plurality of reaction zones followed by cooling zones wherein a monomer sidestream is introduced at least after the first and second reaction zones.

U.S. Pat. No. 3,035,040 to Findlay relates to a multi-stage 1-olefin polymerization process wherein catalyst, olefin and diluent are continuously introduced into a small diameter highly elongated tubular reaction zone, and passing the effluent therefrom to a stirred reactor (or a series of stirred reactors). Unreacted olefin and diluent recovered from the second stage polymerization can be recycled to the tubular zone, and multipoint addition of recycled diluent can be employed for additional temperature control in the elongated reaction zone. The patentee employs streamline or plug-flow like (viz, turbulent) conditions in the tubular reactor to improve catalyst efficiency and to avoid the removal of substantial amounts of unused catalyst from this reactor's effluent as in the case of turbulent flow conditions in the tubular reactor.

U.S. Pat. No. 3,162,620 to Gladding relates to ethylene homopolymers and copolymers which are prepared in the form of a coherent film at a quiescent liquid catalyst surface.

Representative publications dealing with ethylene-alpha-olefin copolymers as lubricating oil additives and other uses are as follows:

U.S. Pat. No. 3,378,606 to Kontos relates to semicrystalline/stereoblock copolymers (having crystallinity content of from 4 to 40 percent) having plastic-rubber properties and comprising alternating blocks. The alternating blocks are recited combinations of crystalline, semicrystalline, crystallizable and amorphous homopolymers and copolymers. U.S. Pat. No. 3,853,969 to Kontos relates to crystallizable stereoblock rubbery copolymers having at least three successive and alternating blocks of, e.g., ethylene-propylene amorphous non-crystallizable atactic copolymer and $C_2$ to $C_{12}$ 1-olefin crystallizable homopolymer.

U.S. Pat. No. 3,380,978 to Ryan et al. relates to a series, two-stage continuous coordination process wherein alpha-olefin is converted in a first stage (which can be accomplished in a short holdup tubular reactor) to a high molecular weight fraction having a broad molecular weight distribution, after which the polymer, remaining catalyst and unconverted monomer are passed directly into a second polymerization zone (a longer holdup, constant environment autoclave reactor) wherein is formed a lower molecular weight fraction having a narrower molecular weight distribution.

U.S. Pat. No. 3,389,087 to Kresge et al. discloses lubricants containing ethylene-alpha-olefin polymers having a microstructure characterized by a high degree of head-to-head linkages of the alpha-olefin. Preferred copolymers exhibit a degree of crystallinity of up to about 25%.

U.S. Pat. No. 3,522,180 discloses copolymers of ethylene and propylene having a number-average molecular weight of 10,000 to 40,000 and a propylene content of 20 to 70 mole percent as V.I. improvers in lube oils. The preferred $\overline{M}_w/\overline{M}_n$ of these copolymers is less than about 4.0.

U.S. Pat. No. 3,551,336 to Jacobson et al. discloses the use of ethylene copolymers of 60-80 mole % ethylene, having no more than 1.3 Wt % of a polymer fraction which is insoluble in normal decane at 55° C. as an oil additive. Minimization of this decane-insoluble fraction in the polymer reduces the tendency of the polymer to form haze in the oil, which haze is evidence of low temperature instability probably caused by adverse interaction with pour depressant additives. The $\overline{M}_w/\overline{M}_n$ of these copolymers is "surprisingly narrow" and is less than about 4.0, preferably less than 2.6, e.g., 2.2.

U.S. Pat. No. 3,691,078 to Johnston et al. discloses the use of ethylene-propylene copolymers containing 25-55 wt. % ethylene which have a pendent index of 18-33 and an average pendent size not exceeding 10 carbon atoms as lube oil additives. The $\overline{M}_w/\overline{M}_n$ is less than about 8. These additives impart to the oil good low temperature properties with respect to viscosity without adversely affecting pour point depressants.

U.S. Pat. No. 3,697,429 to Engel et al. discloses a blend of ethylene-propylene copolymers having different ethylene contents, i.e., a first copolymer of 40-83 wt. % ethylene and $\overline{M}_w/\overline{M}_n$ less than about 4.0 (preferably less than 2.6, e.g. 2.2) and a second copolymer of 3-70 wt. % ethylene and $\overline{M}_w/\overline{M}_n$ less than 4.0, with the content of the first differing from the second by at least 4 wt. % ethylene. These blends, when used as V.I. improvers in lubricating oils, provide suitable low temperature viscosity properties with minimal adverse interaction between the lube oil pour depressant and the ethylene-propylene copolymer.

U.S. Pat. No. 3,798,288 to McManimie et al. relates to a method for preparing ethylene-propylene copolymers (which are purported to be "block" copolymers) which comprises alternately polymerizing one of the monomers and mixtures of the monomers in the presence of a vanadium halide/aluminum alkyl compound catalyst system. The polymer is characterized by alternating "blocks" of ethylene-propylene copolymer (the "heteropolymer") with ethylene (or propylene) homopolymer "blocks". A long chain of the homopolymer is followed by a long chain of heteropolymer, and this pattern can be repeated until the desired molecular weight of the copolymer is obtained. Polymerizations are performed in a stirred reactor provided with two electrically driven turbines.

U.S. Pat. No. 3,879,494 to Milkovitch et al. relates to polyblends of chemically joined, phase separated thermoplastic graft copolymers prepared using macromonomers and characterized by a backbone and linear sidechains. The sidechains are prepared by living polymerization followed by termination by reaction with a halogen-containing compound containing a polymerizable moiety. The terminated living polymers, having a narrow molecular weight distribution ($\overline{M}_w/\overline{M}_n < 1.1$), are then copolymerized with a second monomer(s) during formation of the graft polymer's backbone. The sidechains can comprise ethylene and lower alpha-olefins (although $C_4$ to $C_{12}$ conjugated dienes and certain vinyl-substituted aromatic hydrocarbons are preferred), and the second monomers can comprise alpha-olefins and comonomers comprising at least one vinylidene group and certain conjugated and non-conjugated dienes.

U.S. Pat. No. 4,254,237 to Shiga et al. is directed to propylene-ethylene copolymers (also purported to be "block" polymers) prepared by a three-step polymerization technique, wherein the ethylene/propylene monomer ratios (and the percents of total polymerization amount) of the three steps are 6/94 or less (60-95 wt. %), 15/85 to 79/21 (1-20 wt. %) and 50/50 to 89/11 (4-35 wt. %) in Steps 1, 2 and 3, respectively, with the ethylene/propylene reaction ratio in the third step being larger than in the second step. Polymerizations are accomplished using titanium trichloride and an organo-aluminum compound catalyst system. U.S. Pat. No. 4,337,326 also to Shiga et al. contains a similar disclosure, and its three step ethylene/propylene monomer ratios (and percents of total polymerization amount) are 6/94 or less (60-95 wt. %), 25/74-67/33 (1-20 wt. %) and 76/24-89/11 (4-35 wt. %) in steps 1, 2 and 3, respectfully, wherein in the steps 2 and 3 ethylene alone is supplied, thereby gradually decreasing the amount of propylene in the polymerization system from the first to the succeeding steps.

U.S. Pat. No. 4,414,369 to Kuroda et al. relates to a continuous process for preparing polyolefins (from $C_2$ to $C_6$ olefins) having widely distributed molecular weights in a multi-stage polymerization wherein relatively high molecular weight polymers are first formed, followed to form relatively low molecular weight polymers.

U.S. Pat. No. 4,480,075 to Willis relates to block copolymers prepared by a Ziegler-Natta type polymerization followed by conventional anionic polymerization. The patentee teaches that block copolymers with precise segmented structure which can be obtained with the long-lived anionic systems is not possible with the Ziegler-Natta catalysts because sequential copolymers of the olefin type are swamped with large amounts of the corresponding homopolymers. The patentee indicates that this difficulty stems from the very short average life of nascent chains in Ziegler-Natta catalysis, primarily due to transfer reactions.

U.S. Pat. No. 4,499,242 to Loontjens relates to thermoplastic propylene block copolymers comprising one or more substantially crystalline polypropylene blocks and one or more 1-alkene-propylene copolymer blocks.

Diene units are present in at least one of the 1-alkene-propylene copolymer blocks.

U.S. Pat. No. 4,507,515 to Johnston et al. relates to ethylene-alpha-olefin copolymers useful as improving the low temperature viscosity and pumpability properties of lubricating oil comprised of a major and minor component each of which have a defined ethylene sequence distribution with respect to the number of ethylenes in sequences of 3 or more and the percent of ethylene sequences of 3 or more ethylene units. The major and minor polymer components are discrete polymers which can be prepared in separate reaction processes and blended, or can be prepared in situ in the same reaction process.

U.S. Pat. No. 4,575,574 to Kresge et al. (and its divisional U.S. Pat. No. 4,666,619) relates to ethylene ter- or tetrapolymers useful as a viscosity modifier and to a process for preparing the polymer. The patent discloses that either a continuous flow stirred tank reactor or a tubular rector can be employed.

U.S. Pat. No. 4,620,048 to Ver Strate et al. discloses fluid solutions of polydispersed polymers having improved resistance to mechanical shear.

European Patent Application No. 60,609 to Oda et al. relates to ethylene/alpha-olefin copolymers containing 30 to 90 mole % ethylene and having a Q value ($\overline{M}_w/\overline{M}_n$) of not more than 3 and Z value of from 15 to 200. (The Z value is defined as the ratio of the maximum value of the molecular weight to the minimum value of the molecular weight, as measured by gel-permeation chromatography.) The copolymer is disclosed to be useful as a synthetic lubricant oil or fuel component, have number-average molecular weights of 300 to 30,000, and are formed by a continuous polymerization by feeding the catalyst components, the olefin monomers, hydrogen and optionally an intermediate to the polymerization system.

European Patent Application No. 59,034 to Horada et al. is directed to a process for producing copolymers of ethylene with alpha-olefins (and ethylene/alpha-olefin/polyene terpolymers) wherein two polymerization reactors are employed in series and are operated at different temperature levels. The polymers are disclosed to have excellent processability.

Y. Doi et al., "Block Copolymerization of Propylene and Ethylene with the 'Living' Coordination Catalyst V (acac)$_3$/Al(C$_2$H$_5$)$_2$Cl/Anisole", pgs. 225–229, *Makromol. Chem. Rapid Commun.* Vol. 3 (1982) discloses the preparation of P-R and P-R-P block copolymers of syndiotactic propylene blocks (P) and ethylene-propylene random copolymer blocks (R) of narrow $\overline{M}_w/\overline{M}_n$ ratios (1.22 to 1.24).

G. C. Evens, "'Living' Coordination Polymerization", 1981 *Michigan Molecular Institute on Transition Metal Catalyzed Polymerizations: Unsolved Problems*, pp. 245-265 (1981), also relates to attempts to prepare narrow $\overline{MHD}$ w/$\overline{M}_n$ ratio (1.5-1.8) copolymers consisting of syndiotactic polypropylene blocks and an ethylene propylene rubber block (PP—EPM—PP). When the living polymerization was initiated with small amounts of propylene (very short first "P" block), the $\overline{M}_w/\overline{M}_n$ of the resulting P—R—P block copolymer was reported to be broader (i.e., 2.1; Table III).

BRIEF DESCRIPTION OF THE DRAWINGS

The accompanying drawings depict, for illustration purposes only, processes embodied by the present invention, wherein:

FIGS. 7-17 are graphical illustrations of the chain contours of comparative copolymers 3-1, 3-2, 3-3, 3-4, 3-5, 3-6 and 3-7 and illustrative copolymers 4-1, 4-2, 5-1 and 6-1, respectively, obtained as described in the Examples.

SUMMARY OF THE INVENTION

Figure 1:
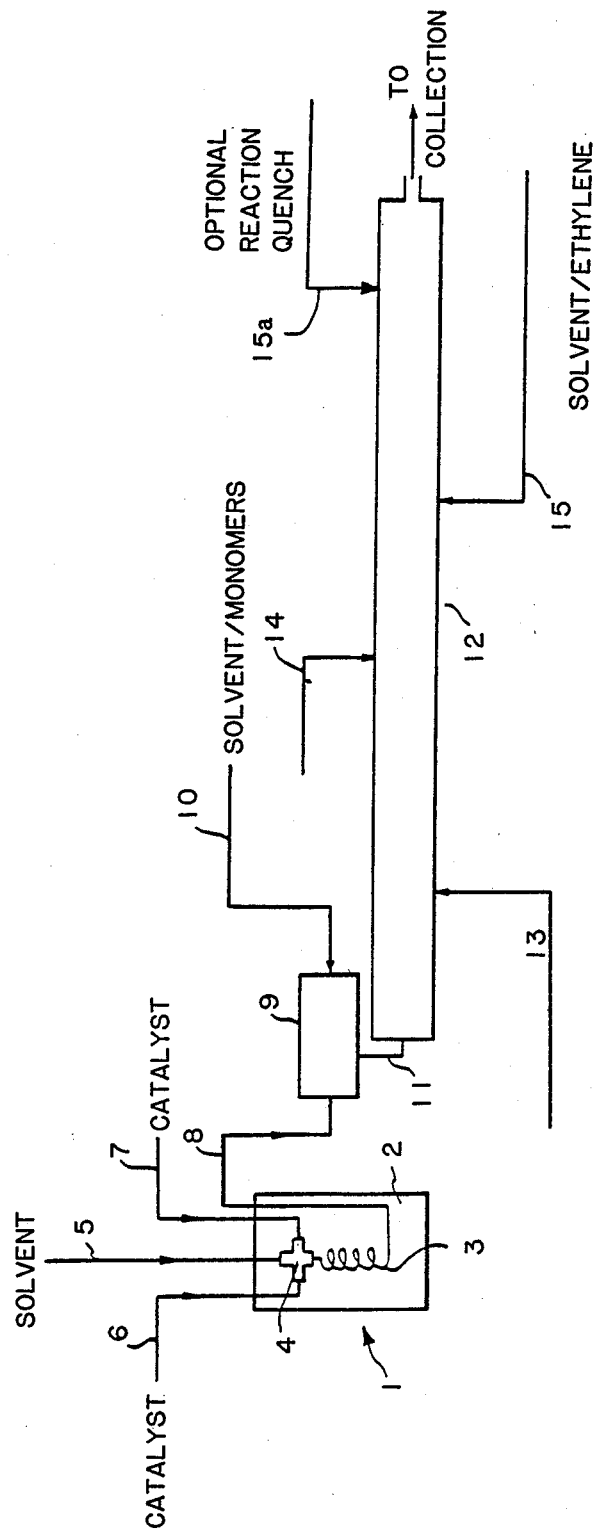
FIG. 1 is a schematic representation of a process for producing polymer in accordance with the present invention.

The present invention is drawn to novel segmented copolymers of ethylene and at least one other alpha-olefin monomer; each copolymer is intramolecularly heterogeneous and intermolecularly homogeneous and at least one segment of the copolymer, constituting at least 10% of the copolymer's chain, is a crystallizable segment. For the purposes of this application, the term "crystallizable segment" is defined to be each segment of the copolymer chain having a number-average molecular weight of at least 700 wherein the ethylene content is at least 55 wt. %. The remaining segments of the copolymer chain are herein termed the "low crystallinity segments" and are characterized by an average ethylene content of not greater than about 53 wt. %. Furthermore, the MWD of copolymer is very narrow. It is well known that the breadth of the molecular weight distribution (MWD) can be characterized by the ratios of various molecular weight averages. For example, an indication of a narrow MWD in accordance with the present invention is that the ratio of weight to number-average molecular weight ($\overline{M}_w/\overline{M}_n$) is less than 2. Alternatively, a ratio of the z-average molecular weight to the weight average molecular weight ($\overline{M}_z/\overline{M}_w$) of less than 1.8 typifies a narrow MWD in accordance with the present invention. It is known that a portion of the property advantages of copolymers in accordance with the present invention are related to these ratios. Small weight fractions of material can disproportionately influence these ratios while not significantly altering the property advantages which depend on them. For instance, the presence of a small weight fraction (e.g. 2%) of low molecular weight copolymer can depress $\overline{M}_n$, and thereby raise $\overline{M}_w/\overline{M}_n$ above 2 while maintaining $\overline{M}_z/\overline{M}_n$ less than 1.8. Therefore, polymers, in accordance with the present invention, are characterized by having at least one of $\overline{M}_w/\overline{M}_n$ less than 2 and $\overline{M}_z/\overline{M}_w$ less than 1.8. The copolymer comprises chains within which the ratio of the monomers varies along the chain length. To obtain the intramolecular compositional heterogeneity and narrow MWD, the copolymers in accordance with the present invention are preferably made in a tubular reactor. It has been discovered that to produce such copolymers requires the use of numerous heretofore undisclosed method steps conducted within heretofore undisclosed preferred ranges. Accordingly, the present invention is also drawn to a method for making the novel copolymers of the present invention.

Copolymers in accordance with the present invention have been found to have improved properties in oleaginous fluids, in particular in lubricating oil. The novel copolymers of this invention are useful in lubricants, especially lubricants intended for use in the crankcase of internal combustion engines, gears, and power transmitting units. Accordingly, one or more objects of the invention are achieved by providing lubricating oil compositions, e.g., automatic transmission fluids, heavy duty oils suitable for use in the crankcases of gasoline and diesel engines, etc., containing the novel copolymers of this invention. Such lubricating oil compositions may contain additional additives such as other viscosity modifiers, ashless dispersants, antioxidants, corrosion inhibitors, detergents, pour point depressants, anti-wear agents, etc.

It has been surprisingly found that the ethylene-alpha-olefin copolymers of this invention, having specific intramolecular composition distributions and degree of crystallinity, provide lubricating oils having highly desirable viscosity and pumpability properties at low temperatures and good filterability at room temperature. Accordingly, the present invention is also drawn to a novel oil additive composition which comprises basestock mineral oil of lubricating viscosity containing an effective amount of a viscosity modifier being copolymer in accordance with the present invention.

DETAILED DESCRIPTION OF THE INVENTION

Not wishing to be bound by theory, it is believed the novel copolymers' improved function as viscosity modifiers can be at least partially attributed to the ability of a controlled portion of the copolymers' molecules to "crystallize" in lubricating oils at temperatures above the cloud point of the lubricating oil. By "crystallize" we mean that the methylene sequences in the polymer associate into some ordered state. This occurs both inter- and intra-molecularly. Lube oil basestocks typically contain paraffinic and isoparaffinic waxy components which are capable of crystallizing. As a basestock is cooled from high temperatures, a temperature is reached at which these wax components begin to crystallize. When the crystals become large they scatter light and make the oil turbid. This is called the "cloud point", which temperature can be determined using the ASTM D-2500 test procedure. Below the cloud point, waxes in the basestock can co-crystallize with crystallizable VM polymer segments, effectively crosslinking the VM polymer molecules, resulting in high "effective" polymer molecular weights, or causing "gelation" of the oil as observed by the appearance of a yield stress upon shearing. Such high molecular weights are undesirable, as they increase the oil viscosity at low temperatures making it difficult for the oil to be pumped or poured.

The associated copolymer molecules of this invention are believed to have a smaller hydrodynamic volume than in their unassociated state, which lowers the relative viscosity of the lubricating oil solution thereof and provides low formulated oil viscosities at low temperatures. It is believed the copolymer's characteristics of exhibiting a higher polymer association temperature than the oil's "cloud point" minimizes interaction with the wax in the oil and accordingly decreases the tendency of oils to undergo gelation. Also, only a portion of these newly discovered copolymer molecules is crystallizable under the use conditions. The noncrystallizable portion is believed to act as a steric barrier to help prevent excessive intermolecular association. The controlled segmented nature of the polymers is essential to their performance. Furthermore, the location of the crystallizable segments is essential. Most preferably, the ethylene content of the crystallizable segments of the copolymers of this invention should not exceed about 75 wt. % ethylene to avoid increasing the polymer association temperature to the point that significant association of the copolymer chains will occur above room temperature, resulting in poor filterability of the lubricating oils containing the copolymer.

The polymers' association temperature (Ta) can be determined by studying the temperature dependance of the relative viscosity ($\eta$rel). Deviation from an established (d$\eta$rel/dT) trend occurs when significant association starts. (ASTM method D445 for kinematic viscosity can be run at a series of temperatures. The polymer concentration in these measurements should be the same as that in the formulated oil, e.g., about 1 wt. %.) If the polymer has already associated above the cloud point temperature, the polymer and wax have little opportunity to interact. Furthermore, if the polymer contains segments which are low enough in ethylene to completely avoid crystallization and are properly located along the contour, these will act as steric blocks to wax or excessive polymer/polymer interaction. Thus, two polymer characteristics are needed: crystallization above the wax appearance temperature and a segmented structure to stabilize agglomeration before gels form.

As already noted above, the present invention is drawn to novel segmented copolymers of ethylene and at least one other alpha-olefin monomer wherein the copolymer's chain contains at least one crystallizable segment of ethylene monomer units, as will be more completely described below, and at least one low crystallinity ethylene-alpha-olefin copolymer segment, wherein the low crystallinity copolymer segment is characterized in the unoriented bulk state after at least 24 hours annealing by a degree of crystallinity of less than about 0.2% at 23° C., and wherein the copolymer's chain is intramolecularly heterogeneous and intermolecularly homogeneous, and has an MWD characterized by at least one of $\overline{M}_w/\overline{M}_n$ of less than 2 and $\overline{M}_z/\overline{M}_w$ of less than 1.8. The crystallizable segments comprise from about 10 to 90 wt. %, preferably from about 20 to 85 wt. %, and more preferably from about 40 to 65 wt. %, of the total copolymer chain, and contain an average ethylene content which is at least about 57 wt. %, preferably at least about 62 wt. %., and more preferably at least about 60 wt. %, and most preferably at least about 63 wt. % and which is not greater than 95 wt. %, more preferably <85%, and most preferably <75 wt. % (e.g., from about 58 to 68 wt. %). The low crystallinity copolymer segments comprise from about 90 to 10 wt. %, preferably from about 80 to 15 wt. %, and more preferably from about 65 to 35 wt. %, of the total copolymer chain, and contain an average ethylene content of from about 20 to 53 wt. %, preferably from about 30 to 50 wt. %, and more preferably from about 35 to 50 wt. %. The copolymers in accordance with the present invention comprise intramolecularly heterogeneous chain segments wherein at least two portions of an individual intramolecularly heterogeneous chain, each portion comprising at least 5 weight percent of the chain and having a molecular weight of at least 7000 contain at least 5 wt. % ethylene and differ in composition from one another by at least 5 weight percent ethylene, wherein the intermolecular compositional dispersity of the polymer is such that 95 wt. % of the polymer chains have a composition 15% or less different in ethylene from the average weight percent ethylene composition, and wherein the copolymer is characterized by at least one or a ratio of $\overline{M}_w/\overline{M}_n$ of less than 2 and a ratio of $\overline{M}_z/\overline{M}_w$ of less than 1.8.

As described above, the copolymers of this invention will contain at least one crystallizable segment rich in methylene units (hereinafter called an "M" segment) and at least one low crystallinity ethylene-alpha-olefin copolymer segment (hereinafter called a "T" segment). The copolymers may be therefore illustrated by copolymers selected from the group consisting of copolymer chain structures having the following segment sequences:

$$M—T, \quad (I)$$

$$T^1—(M—T^2)x, \text{ and} \quad (II)$$

$$T^1—(M^1—T^2)y—M^2 \quad (III)$$

wherein M and T are defined above, $M^1$ and $M^2$ can be the same or different and are each M segments, $T^1$ and $T^2$ can be the same or different and are each T segments, x is an integer of from 1 to 3 and y is an integer of 1 to 3.

In structure II (x=1), the copolymer's M segment is positioned between two T segments, and the M segment can be positioned substantially in the center of the polymer chain (that is, the $T^1$ and $T^2$ segments can be substantially the same molecular weight and the sum of the molecular weight of the $T^1$ and $T^2$ segments can be substantially equal to the molecular weight of the M segment), although this is not essential to the practice of this invention. Preferably, the copolymer will contain only one M segment per chain. Therefore, structures I and II (x=1) are preferred.

Preferably, the M segments and T segments of the copolymer are located along the copolymer chain so that only a limited number of the copolymer chains can associate before the steric problems associated with packing the low crystallinity T segments prevents further agglomeration. Therefore, in a preferred embodiment, the M segment is located near the center of the copolymer chain and only one M segment is in the chain.

As will be shown below, a copolymer of the structure $$M^1—(T—M^2)z \quad (IV)$$

(wherein $M^1$, $M^2$ and T are as define above, and wherein z is an integer of at least 1) are undesirable as viscosity modifier polymers. It has been found that solutions of structure IV copolymers in oil tend to gel even when the M and T portions have exactly the same composition and molecular weight as structure II copolymers (with x=z=1). It is believed this poor viscosity modifier performance is due to the inability of a center T segment to sterically stabilize against association.

The M segments of the copolymers of this invention comprise ethylene and can also comprise at least one other alpha-olefin, e.g., containing 3 to 18 carbon atoms. The T segments comprise ethylene and at least one other alpha-olefin, e.g., alpha-olefins containing 3 to 18 carbon atoms. The M and T segments can also comprise other polymerizable monomers, e.g., non-conjugated dienes or cyclic mono-olefins.

Since the present invention is considered to be most preferred in the context of ethylene-propylene (EPM) copolymers or ethylene-propylene-diene (EPDM) terpolymers, it will be described in detail in the context of EPM and/or EPDM.

Copolymer in accordance with the present invention is preferably made in a tubular reactor. When produced in a tubular reactor with monomer feed only at the tube inlet, it is known at the beginning of the tubular reactor, ethylene, due to its high reactivity, will be preferentially polymerized. The concentration of monomers in solution changes along the tube in favor of propylene as the ethylene is depleted. The result, with monomer feed only at the inlet, is copolymer chains which are higher in ethylene concentration in the chain segments grown near the reactor inlet (as defined at the point at which the polymerization reaction commences), and higher in propylene concentration in the chain segments formed near the reactor outlet. These copolymer chains are therefore tapered in composition. An illustrative copolymer chain of ethylene-propylene is schematically presented below with E representing ethylene constitutents and P representing propylene constituents in the chain:

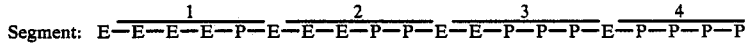

As can be seen from this illustrative schematic chain, the far left-hand segment (1) thereof represents that portion of the chain formed at the reactor inlet where the reaction mixture is proportionately richer in the more reactive constituent ethylene. This segment comprises four ethylene molecules and one propylene molecule. However, as subsequent segments are formed from left to right with the more reactive ethylene being depleted and the reaction mixture proportionately increasing in propylene concentration, the subsequent chain segments become more concentrated in propylene. The resulting chain is intramolecularly heterogeneous.

In the event that more than two monomers are used, e.g., in the production of EDPM using a diene termonomer, for purposes of describing the present invention all properties related to homogeneity and heterogeneity will refer to the relative ratio of ethylene to the other monomers in the chain, or any segment thereof. The property, of the copolymer discussed herein, related to intramolecular compositional dispersity (compositional variation within a chain) shall be referred to as Intra-CD, and that related to intermolecular compositional dispersity (compositional variation between chains) shall be referred to as Inter-CD.

For copolymers in accordance with the present invention, composition can vary between chains as well as along the length of the chain. An object of this invention is to minimize the amount of interchain variation. The Inter-CD can be characterized by the difference in composition between the copolymer fractions containing the highest and lowest quantity of ethylene. Techniques for measuring the breadth of the Inter-CD are known as illustrated by Junghanns et al. (cited above, p. 25) wherein a p-xylene/dimethylformamide solvent/- non-solvent was used to fractionate copolymer into fractions of differing intermolecular composition. Other solvent/non-solvent systems can be used as hexane/2 propanol, as will be discussed in more detail below.

The Inter-CD of copolymer in accordance with the present invention is such that 95 wt. % of the copolymer chains have an ethylene composition that differs from the average weight percent ethylene composition by 15 wt. % or less. The preferred Inter-CD is about 13% or less, with the most preferred being about 10% or less. In comparison, Junghanns et al. found that their tubular reactor copolymer had an Inter-CD of greater than 15 wt. %.

Broadly, the Intra-CD of copolymer in accordance with the present invention is such that at least two portions of an individual intramolecularly heterogeneous chain, each portion comprising at least 5 weight percent of the chain, differ in composition from one another by at least 7 weight percent ethylene. Unless otherwise indicated, this property of Intra-CD as referred to herein is based upon at least two 5 weight percent portions of copolymer chain. The Intra-CD of copolymer in accordance with the present invention can be such that at least two portions of copolymer chain differ by at least 10 weight percent ethylene. Differences of at least 20 weight percent, as well as, of at least 40 weight percent ethylene are also considered to be in accordance with the present invention.

The experimental procedure for determining Intra-CD is as follows. First the Inter-CD is established as described below, then the polymer chain is broken into fragments along its contour and the Inter-CD of the fragments is determined. The difference in the two results is due to Intra-CD as can be seen in the illustrative example below.

Consider a heterogeneous sample polymer containing 30 monomer units. It consists of 3 molecules designated A, B, C.

| A | EEEEPEEEPEEEPPEEPPEPPPEPPPPPPP |
| B | EEEEEPEEEPEEEPPEEEPPPEPPPEEPPP |
| C | EEPEEEPEEEPEEEPEEEPPEEPPPEEPPP |

Molecule A is 36.8 wt. % ethylene, B is 46.6%, and C is 50% ethylene. The average ethylene content for the mixture is 44.3%. For this sample the Inter-CD is such that the highest ethylene polymer contains 5.7% more ethylene than the average while the lowest ethylene content polymer contains 7.5% less ethylene than the average. Or, in other words, 100 weight % of the polymer is within +5.7% and −7.5% ethylene about an average of 44.3%. Accordingly, the Inter-CD is 7.5% when the given weight % of the polymer is 100%. The distribution may be represented schematically as by curve 1 in FIG. 3.

If the chains are broken into fragments, there will be a new Inter-CD. For simplicity, consider first breaking only molecule A into fragments shown by the slashes as follows:

EEEEP/EEEPE/EEPPE/EPPEP/-
PPEPP/PPPPP

Figure 3:
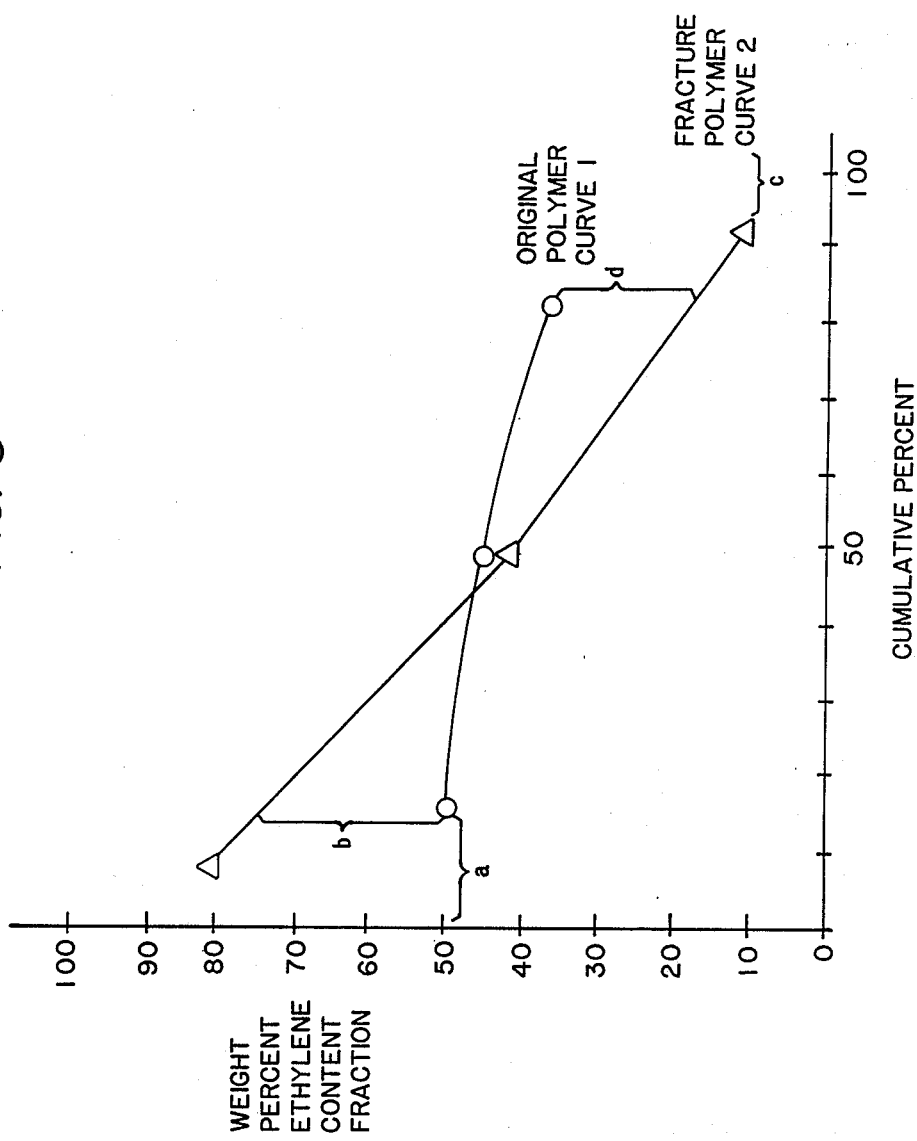
FIG. 3 is a graphical illustration of a technique for determining Intra-CD of a copolymer.
Figure 4:
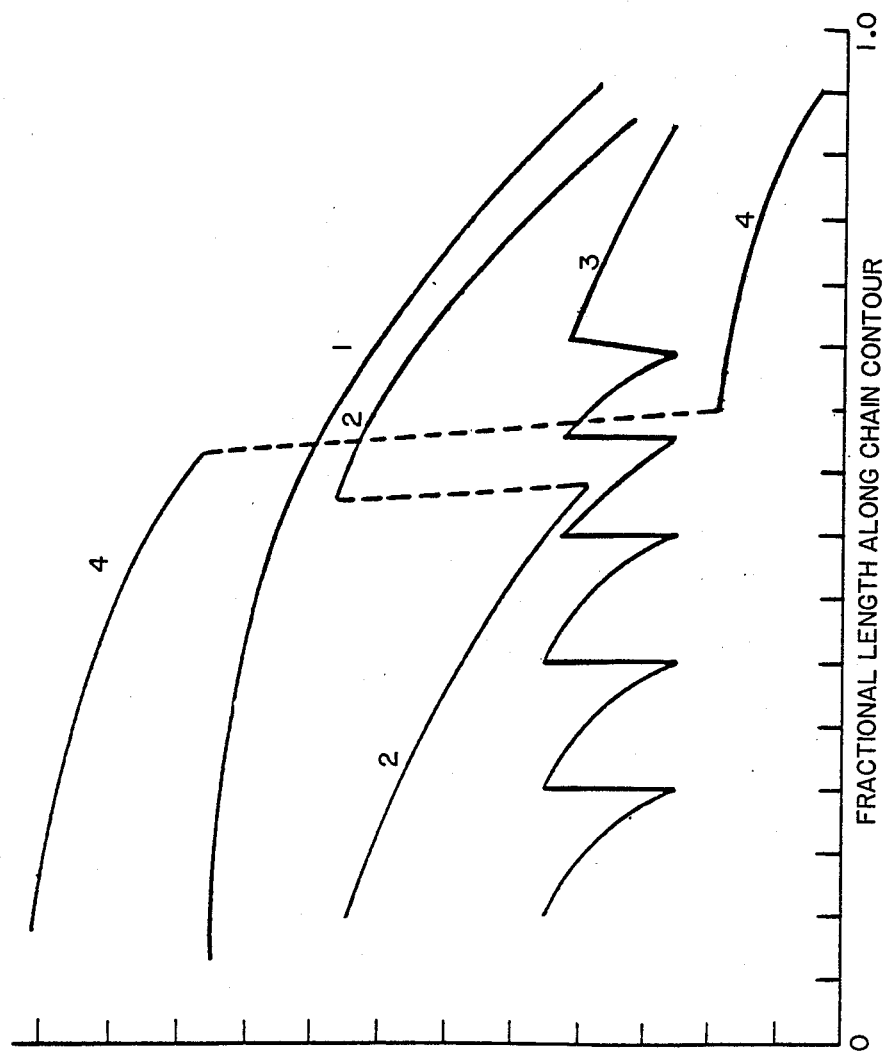
FIG. 4 graphically illustrates copolymer structures disclosed in U.S. Pat. No. 4,540,753.

Portions of 72.7%, 72.7%, 50%, 30.8%, 14.3% and 0% ethylene are obtained. If molecules B and C are similarly broken and the weight fractions of similar composition are grouped the new Inter-CD shown by curve 2 in FIG. 3 is obtained. The difference between the two curves in the figure is due to Intra-CD.

Consideration of such data, especially near the end point ranges, demonstrates that for this sample at least 5% of the chain contour represented by the cumulative weight % range (a) differs in composition from another section by at least 15% ethylene shown as (b), the difference between the two curves. The difference in composition represented by (b) cannot be intermolecular. If it were, the separation process for the original polymer would have revealed the higher ethylene contents seen only for the degraded chain.

The compositional differences shown by (b) and (d) in the figure between original and fragmented chains give minimum values for Intra-CD. The Intra-CD must be at least that great, for chain sections have been isolated which are the given difference in composition (b) or (d) from the highest or lowest composition polymer isolated from the original. We know in this example that the original polymer represented at (b) had sections of 72.7% ethylene and 0% ethylene in the same chain. It is highly likely that due to the inefficiency of the fractionation process any real polymer with Intra-CD examined will have sections of lower or higher ethylene connected along its contour than that shown by the end points of the fractionation. Thus, this procedure determines a lower boundary for Intra-CD. To enhance the detection, the original whole polymer can be fractionated (e.g., separate molecule A from molecule B from molecule C in the hypothetical example) with these fractions refractionated until they show no (or less) Inter-CD. Subsequent fragmentation of this intermolecularly homogeneous fraction now reveals the total Intra-CD. In principle, for the example, if molecule A were isolated, fragmented, fractionated and analyzed, the Intra-CD for the chain sections would be 72.7−0%=72.7% rather than 72.7−50%=22.7% seen by fractionating the whole mixture of molecules A, B, and C.

In order to determine the fraction of a polymer which is intramolecularly heterogeneous in a mixture of polymers combined from several sources the mixture must be separated into fractions which show no further heterogenity upon subsequent fractionation. These fractions are subsequently fractured and fractionated to reveal which are heterogeneous.

The fragments into which the original polymer is broken should be large enough to avoid end effects and to give a reasonable opportunity for the normal statistical distribution of segments to form over a given monomer conversion range in the polymerization. Intervals of ca 5 weight % of the polymer are convenient. For example, at an average polymer molecular weight of about $10^5$, fragments of ca 5000 molecular weight are appropriate. A detailed mathematical analysis of plug flow or batch polymerization indicates that the rate of change of composition along the polymer chain contour will be most severe at high ethylene conversion near the end of the polymerization. The shortest fragments are needed here to show the low ethylene content sections.

The best available technique for determination of compositional dispersity for non-polar polymers is solvent/non-solvent fractionation which is based on the thermodynamics of phase separation. This technique is described in "Polymer Fractionation", M. Cantow editor, Academic 1967, p. 341 ff and in H. Inagaki, T. Tanaku, *"Developments in Polymer Characterization"*, 3, 1, (1982). These are incorporated herein by reference.

For non-crystalline copolymers of ethylene and propylene, molecular weight governs insolubility more than does composition in a solvent/non-solvent solution. High molecular weight polymer is less soluble in a given solvent mix. Also, there is a systematic correlation of molecular weight with ethylene content for the polymers described herein. Since ethylene polymerizes much more rapidly than propylene, high ethylene polymer also tends to be high in molecular weight. Additionally, chains rich in ethylene tend to be less soluble in hydrocarbon/polar non-solvent mixtures than propylene-rich chains. Furthermore, for crystalline segments, solubility is significantly reduced. Thus, the high molecular weight, high ethylene chains are easily separated on the basis of thermodynamics.

A fractionation procedure is as follows: Unfragmented polymer is dissolved in n-hexane at 23° C. to form ca a 1% solution (1 g polymer/100 cc hexane). Isopropyl alcohol is titrated into the solution until turbidity appears at which time the precipitate is allowed to settle. The supernatant liquid is removed and the precipitate is dried by pressing between Mylar ® (polyethylene terphthalate) film at 150° C. Ethylene content is determined by ASTM method D-3900. Titration is resumed and subsequent fractions are recovered and analyzed until 100% of the polymer is collected. The titrations are ideally controlled to produce fractions of 5-10% by weight of the original polymer, especially at the extremes of composition.

To demonstrate the breadth of the distribution, the data are plotted as % ethylene versus the cumulative weight of polymer as defined by the sum of half the weight % of the fraction of that composition plus the total weight % of the previously collected fractions.

Another portion of the original polymer is broken into fragments. A suitable method for doing this is by thermal degradation according to the following procedure: In a sealed container in a nitrogen-purged oven, a 2mm thick layer of the polymer is heated for 60 minutes at 330° C. (The time or temperature can be empirically adjusted based on the ethylene content and molecular weight of the polymer.) This should be adequate to reduce a $10^5$ molecular weight polymer to fragments of ca 5000 molecular weight. Such degradation does not substantially change the average ethylene content of the polymer, although propylene tends to be lost on scission in preference to ethylene. This polymer is fractionated by the same procedure as the high molecular weight precursor. Ethylene content is measured, as well as molecular weight on selected fractions.

The procedure to characterize intramolecular heterogeneity is laborious and even when performed at an absolute optimum, does not show how the segments of the chain are connected. In fact it is not possible, with current technology, to determine the polymer structure without recourse to the synthesis conditions. With knowledge of the synthesis conditions, the structure can be defined as follows.

Ethylene, propylene or high alpha-olefin polymerizations with transition metal catalysts can be described by the terminal copolymerization model, to an approximation adequate for the present purpose. (G. Ver Strate, *Encyclopedia of Polymer Science and Engineering*, vol. 6, 522 (1986)). In this model, the relative reactivity of the two monomers is specified by two reactivity ratios defined as follows:

$$R_1 = \frac{\text{(rate constant for ethylene adding to ethylene)}}{\text{(rate constant for propylene adding to ethylene)}}$$

$$R_2 = \frac{\text{(rate constant for propylene adding to propylene)}}{\text{(rate constant for ethylene adding to propylene)}}$$

Given these two constants, at a given temperature, the ratio of the molar amount of ethylene, E, to the molar amount of propylene, P, entering the chain from a solution containing ethylene and propylene at molar concentrations [E] and [P] respectively is $$\frac{E}{P} = \frac{[E]}{[P]} \cdot \frac{(R_1[E] + [P])}{([E] + R_2[P])} \quad (1)$$

The relation of E and P to the weight % ethylene in the polymer is as follows $$\text{weight \% ethylene} = \frac{E}{E + 1.5P} \cdot 100$$

The values of $R_1$ and $R_2$ are dependent on the particular comonomer and catalyst employed to prepare the polymer, the polymerization temperature and, to some extent, the solvent.

For all transition metal catalysts specified herein, $R_1$ is significantly larger than $R_2$. Thus, as can be seen from equation (1), ethylene will be consumed more rapidly than propylene for a given fraction of the monomer in the reacting medium. Thus, the ratio of [E]/[P] will decrease as the monomers are consumed. Only if $R_1 = R_2$ will the composition in the polymer equal that in the reacting medium.

If the amount of monomer that has reacted at a given time in a batch reactor or at a given point in a tubular reactor can be determined, it is possible through equation (1), to determine the instantaneous composition being formed at a given point along the polymer chain. Demonstration of narrow MWD and increasing MW along the tube proves the compositional distribution is intramolecular. The amount of polymer formed can be determined in either of two ways. Samples of the polymerizing solution may be collected, with appropriate quenching to terminate the reaction at various points along the reactor, and the amount of polymer formed evaluated. Alternatively, if the polymerization is run adiabatically and the heat of polymerization is known, the amount of monomer converted may be calculated from the reactor temperature profile.

Finally, if the average composition of the polymer is measured at a series of locations along the tube, or at various times in the batch polymerization case, it is possible to calculate the instantaneous composition of the polymer being made. This technique does not require knowledge of $R_1$ and $R_2$ or the heat of polymerization, but it does require access to the polymer synthesis step.

All of these methods have been employed with consistent results.

For the purpose of this patent, $R_1$ and $R_2$ thus simply serve to characterize the polymer composition in terms of the polymerization conditions. By defining $R_1$ and $R_2$, we are able to specify the intramolecular compositional distribution. In the examples shown below where $VC_{14}$ and ethylaluminum sesquichloride are employed in hexane as solvent, $R_1 = 1.8 \exp(+500/RT_k)$ and $R_2 = 3.2 \exp(-1500/RT_k)$. Where "R" is the gas constant (1.98 cal/deg-mole) and "$T_k$" is degrees Kelvin. For reference, at 20° C. $R_1=9.7$, $R_2=0.02$.

In FIGS. 4 and 7–17 the intramolecular compositional distributions have been calculated using these $R_1$, $R_2$, the known reactor feed conditions, the observed heat of polymerization in the adiabatic reactor, and the following expressions relating heat of polymerization and polymer composition.

$$\text{Heat of polymerization} = 485 + 317 \times (E/(E+P)) \text{ cal/gm} \quad (2)$$

The $R_1$ and $R_2$ given above predict the correct final average polymer composition. If the $R_1$ and $R_2$ and expression (2) are someday proven to be inaccurate the polymer intramolecular compositional distribution will remain as defined herein in terms of the polymerization conditions but may have to be modified on the absolute composition scales presented in FIGS. 7–17. There is little likelihood that they are in error by more than a few percent, however.

Ethylene content is measured by ASTM-D3900 for ethylene-propylene copolymers between 35 and 85 wt. % ethylene. Above 85% ASTM-D2238 can be used to obtain methyl group concentrations which are related to percent ethylene in an unambiguous manner for ethylene-propylene copolymers. When comonomers other than propylene are employed no ASTM tests covering a wide range of ethylene contents are available; however, proton and carbon-13 nuclear magnetic resonance spectroscopy can be employed to determine the composition of such polymers. These are absolute techniques requiring no calibration when operated such that all nucleii of a given element contribute equally to the spectra. For ranges not covered by the ASTM tests for ethylene-propylene copolymers, these nuclear magnetic resonance methods can also be used.

Molecular weight and molecular weight distribution are measured using a Waters 150C gel permeation chromatograph equipped with a Chromatix KMX-6 (LDC-Milton Roy, Riviera Beach, Fla.) on-line light scattering photometer. The system is used at 135° C. with 1,2,4 trichlorobenzene as mobile phase. Showdex (Showa-Denko America, Inc.) polystyrene gel columns 802, 803, 804 and 805 are used. This technique is discussed in "Liquid Chromatography of Polymers and Related Materials III", J. Cazes editor. Marcel Dekker, 1981, p. 207 (incorporated herein by reference). No corrections for column spreading are employed; however, data on generally accepted standards, e.g., National Bureau of Standards Polyethene 1484 and anionically produced hydrogenated polyisoprenes (an alternating ethylene-propylene copolymer) demonstrate that such corrections on $\overline{M}_w/\overline{M}_n$ or $\overline{M}_z/\overline{M}_w$ are less than 0.05 unit. $\overline{M}_w/\overline{M}_n$ is calculated from an elution time-molecular weight relationship whereas $\overline{M}_z/\overline{M}_w$ is evaluated using the light scattering photometer. The numerical analyses can be performed using the commercially available computer software GPC2, MOLWT2 available from LDC/Milton Roy-Riviera Beach, Fla.

As already noted, copolymers in accordance with the present invention are comprised of ethylene and at least one other alpha-olefin. It is believed that such alpha-olefins could include those containing 3 to 18 carbon atoms, e.g., propylene, butene-1, pentene-1, etc. Alpha-olefins of 3 to 6 carbons are preferred due to economic considerations. The most preferred copolymers in accordance with the present invention are those comprised of ethylene and propylene or ethylene, propylene and diene.

As is well known to those skilled in the art, copolymers of ethylene and higher alpha-olefins such as propylene often include other polymerizable monomers. Typical of these other monomers may be non-conjugated dienes such as the following non-limiting examples:

a. straight chain acyclic dienes such as: 1,4-hexadiene; 1,6-octadiene;
b. branched chain acyclic dienes such as: 5-methyl-1, 4-hexadiene; 3,7-dimethyl-1,6-octadiene; 3,7-dimethyl-1,7-octadiene and the mixed isomers of dihydromyrcene and dihydroocinene;
c. single ring alicyclic dienes such as: 1,4-cyclohexadiene; 1,5-cyclooctadiene; and 1,5-cyclododecadiene;
d. multi-ring alicyclic fused and bridged ring dienes such as: tetrahydroindene; methyltetrahydroindene; dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-propylene-2-norbornene, 5-isopropylidene-2-norbornene, 5-(4-cycloentenyl)-2-norbornene; 5-cyclohexylidene-2-norbornene.

Of the non-conjugated dienes typically used to prepare these copolymers, dienes containing at least one of the double bonds in a strained ring are preferred. The most preferred diene is 5-ethylidene-2-norbornene (ENB). The amount of diene (wt. basis) in the copolymer could be from about 0% to 20% with 0% to 15% being preferred. The most preferred range is 0% to 10%.

As already noted, the most preferred copolymer in accordance with the present invention is ethylene-propylene or ethylene-propylene-diene. In either event, the average ethylene content of the copolymer could be as low as about 20% on a weight basis. The preferred minimum is about 25%. A more preferred minimum is about 30%. The maximum ethylene content could be about 90% on a weight basis. The preferred maximum is about 85%, with the most preferred being about 80%. Preferably, the copolymers of this invention intended for use as viscosity modifier contain from about 35 to 75 wt. % ethylene, and more preferably from about 50 to 70 wt. % ethylene.

The molecular weight of copolymer made in accordance with the present invention can vary over a wide range. It is believed that the weight-average molecular weight could be as low as about 2,000. The preferred minimum is about 10,000. The most preferred minimum is about 20,000. It is believed that the maximum weight-average molecular weight could be as high as about 12,000,000. The preferred maximum is about 1,000,000. The most preferred maximum is about 750,000. An especially preferred range of weight-average molecular weight for copolymers intended for use as V.M. polymer is from 50,000 to 500,000.

The copolymers of this invention will also be generally characterized by a Mooney viscosity (i.e., $M_L(1'+4')$ 125° C.) of from about 1 to 100, preferably from about 10 to 70, and more preferably from about 15 to 65, and by a thickening efficiency ("TE") of from about 0.4 to 5.0, preferably from about 1.0 to 4.0, most preferably from about 1.4 to 3.8.

Another feature of copolymer made in accordance with the present invention is that the molecular weight distribution (MWD) is very narrow, as characterized by at least one of a ratio of $\overline{M}_w/\overline{M}_n$ of less than 2 and a ratio of $\overline{M}_z/\overline{M}_w$ of less than 1.8. As relates to EPM and EPDM, a typical advantage of such copolymers having narrow MWD is resistance to shear degradation. Particularly for oil additive applications, the preferred copolymers have $\overline{M}_w/\overline{M}_n$ less than about 1.5, with less than about 1.25 being most preferred. The preferred $\overline{M}_z/\overline{M}_w$ is less than about 1.5, with less than about 1.2 being most preferred.

Processes in accordance with the present invention produce copolymer by polymerization of a reaction mixture comprised of catalyst, ethylene and at least one additional alpha-olefin monomer, wherein the amounts of monomer, and preferably ethylene, is varied during the course of the polymerization in a controlled manner as will be hereinafter described. Solution polymerizations are preferred.

Any known solvent for the reaction mixture that is effective for the purpose can be used in conducting solution polymerizations in accordance with the present invention. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are C12 or lower, straight chain or branched chain hydrocarbons, particularly hexane. Non-limiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

These processes are carried out in a mix-free reactor system, which is one in which substantially no mixing occurs between portions of the reaction mixture that contain polymer chains initiated at different times. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. However, it is well known that 3 or more stirred tanks in series with all of the catalyst fed to the first reactor can approximate the performance of a tubular reactor. Accordingly, such tanks in series are considered to be in accordance with the present invention.

A batch reactor is a suitable vessel, preferably equipped with adequate agitation, to which the catalyst, solvent, and monomer are added at the start of the polymerization. The charge of reactants is then left to polymerize for a time long enough to produce the desired product or chain segment. For economic reasons, a tubular reactor is preferred to a batch reactor for carrying out the processes of this invention.

In addition to the importance of the reactor system to make copolymers in accordance with the present invention, the polymerization should be conducted such that:

(a) the catalyst system produces essentially one active catalyst species,
(b) the reaction mixture is essentially free of chain transfer agents, and
(c) the polymer chains are essentially all initiated simultaneously, which is at the same time for a batch reactor or at the same point along the length of the tube for a tubular reactor.

To prepare copolymer structures II and III above (and, optionally, to prepare copolymer structure I above), additional solvent and reactants (e.g., at least one of the ethylene, alpha-olefin and diene) will be added either along the length of a tubular reactor or during the course of polymerization in a batch reactor, or to selected stages of stirred reactors in series in a controlled manner (as will be hereinafter described) to form the copolymers of this invention. However, it is necessary to add essentially all of the catalyst at the inlet of the tube or at the onset of batch reactor operation to meet the requirement that essentially all polymer chains are initiated simultaneously.

Accordingly, processes in accordance with the present invention are carried out:
(a) in at least one mix-free reactor,
(b) using a catalyst system that produces essentially one active catalyst species,
(c) using at least one reaction mixture which is essentially transfer agent-free, and
(d) in such a manner and under conditions sufficient to initiate propagation of essentially all polymer chains simultaneously.

Since the tubular reactor is the preferred reactor system for carrying out processes in accordance with the present invention, the following illustrative descriptions and examples are drawn to that system, but will apply to other reactor systems as will readily occur to the artisan having the benefit of the present disclosure.

In practicing processes in accordance with the present invention, use is preferably made of at least one tubular reactor. Thus, in its simplest form, such a process would make use of but a single reactor. However, as would readily occur to the artisan having the benefit of the present disclosure, a series of reactors could be used with multiple monomer feed to vary intramolecular composition as described below.

Structures described in the U.S. Pat. No. 4,540,753, obtained by adding additional monomer(s) during the course of the polymerization, are shown in curves 1–4 of FIG. 4, wherein composition is plotted versus position along the contour length of the chain. The Intra-CD of curve 1 is obtained by feeding all of the monomers at the tubular reactor inlet or at the start of a batch reaction. In comparison, the Intra-CD of curve 2 is made by adding additional ethylene (and, optionally, propylene) at a point along the tube or, in a batch reactor, where the chains have reached about half their length. The Intra-CD's of Curve 3 requires multiple feed additions. The Intra-CD of curve 4 is formed if additional comonomer rather than ethylene is added, thereby permitting a whole ethylene composition range to be omitted from the chain.

The composition of the catalyst used to produce alpha-olefin copolymers has a profound effect on copolymer product properties such as compositional dispersity and MWD. The catalyst utilized in practicing processes in accordance with the present invention should be such as to yield essentially one active catalyst species in the reaction mixture. More specifically, it should yield one primary active catalyst species which provides for substantially all of the polymerization reaction. Additional active catalyst species could provide as much as 35% (weight) of the total copolymer. Preferably, they should account for about 10% or less of the copolymer. Thus, the essentially one active species should provide for at least 65% of the total copolymer produced, preferably for at least 90% thereof. The extent to which a catalyst species contributes to the polymerization can be readily determined using the below-described techniques for characterizing catalyst according to the number of active catalyst species.

Techniques for characterizing catalyst according to the number of active catalyst species are within the skill of the art, as evidenced by an article entitled "Ethylene-Propylene Copolymers. Reactivity Ratios, Evaluation and Significance", C. Cozewith and G. Ver Strate, *Macromolecules*, 4, 482 (1971), which is incorporated herein by reference.

It is disclosed by the authors that copolymers made in a continuous flow stirred reactor should have an MWD characterized by $\overline{M}_w/\overline{M}_n=2$ and a narrow Inter-CD when one active catalyst species is present. By a combination of fractionation and gel permeation chromatography (GPC) it is shown that for single active species catalysts the compositions of the fractions vary no more than ±3% about the average and the MWD (weight- to number-average ratio) for these samples approaches 2. It is this latter characteristic ($\overline{M}_w/\overline{M}_n$ of about 2) that is deemed the more important in identifying a single active catalyst species. On the other hand, other catalysts gave copolymer with an Inter-CD greater than +10% about the average and multi-modal MWD often with $\overline{M}_w/\overline{M}_n$ greater than 10. These other catalysts are deemed to have more than one active species.

Catalyst systems to be used in carrying out processes in accordance with the present invention may be Ziegler catalysts, which may typically include:

(a) a compound of a transition metal, i.e., a metal of Groups I-B, III-B, IVB, VB, VIB, VIIB and VIII of the Periodic Table, and (b) an organometal compound of a metal of Groups I-A, II-A, II-B and III-A of the Periodic Table.

The preferred catalyst system in practicing processes in accordance with the present invention comprises hydrocarbon-soluble vanadium compound in which the vanadium valence is 3 to 5 and an organo-aluminum compound, with the proviso that the catalyst yields essentially one active catalyst species as described above. At least one of the vanadium compound/organo-aluminum pair selected must also contain a valence-bonded halogen.

In terms of formulas, vanadium compounds useful in practicing processes in accordance with the present invention could be:

$$\overset{O}{\underset{\|}{V}}Cl_x(OR)_{3-x}$$
where x = 0-3 and R = a hydrocarbon radical;

VCl$_4$;

VO(AcAc)$_2$,
where AcAc = acetyl acetonate which may or may not be alkyl-substituted (eg. C$_1$ to C$_6$ alkyl);

V(AcAc)$_3$;

V(dicarbonyl moiety)$_3$;

VOCl$_x$(AcAc)$_{3-x}$,
where x = 1 or 2;

V(dicarbonyl moiety)$_3$Cl; and

VCl$_3$.nB,
where n = 2—3, B = Lewis base capable of making hydrocarbon-soluble complexes with VCl$_3$, such as tetrahydrofuran, 2-methyl-tetrahydrofuran and dimethyl pyridine, and the dicarbonyl moiety is derived from a dicarbonyl compound of the formula:

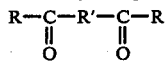

In formula (1) above, each R (which can be the same or different) preferably represents a C$_1$ to C$_{10}$ aliphatic, alicyclic or aromatic hydrocarbon radical such as ethyl (Et), phenyl, isopropyl, butyl, propyl, n-butyl, i-butyl, t-butyl, hexyl, cyclohexyl, octyl, naphthyl, etc. R' preferably represents an alkylene divalent radical of 1 to 6 carbons (e.g., —CH$_2$—, —C$_2$H$_4$—, etc.). Non-limiting illustrative examples of formula (1) compounds are vanadyl trihalides, alkoxy halides and alkoxides such as VOCl$_3$, VOCl$_2$(OBu) where Bu=butyl, and VO(OC$_2$H$_5$)$_3$. The most preferred vanadiu compounds are VC$_{14}$, VOCl$_3$, and VOCl$_2$(OR).

As already noted, the co-catalyst is preferably organo-aluminum compound. In terms of chemical formulas, these compounds could be as follows:

| | |
|---|---|
| AlR$_3$, | Al(OR)R$_2$, |
| AlR$_2$Cl, | R$_2$Al—AlR$_2$, |
| AlR'RCl, | AlR$_2$I, |
| Al$_2$R$_3$Cl$_3$, | and |
| AlRCl$_2$, | | where R and R' represent hydrocarbon radicals, the same or different, as described above with respect to the vanadium compound formula. The most preferred organo-aluminum compound is an aluminum alkyl sesquichloride such as Al$_2$Et$_3$Cl$_3$ or Al$_2$(iBu)$_3$Cl$_3$.

In terms of performance, a catalyst system comprised of VCl$_4$ and Al$_2$R$_3$Cl$_3$, preferably where R is ethyl, has been shown to be particularly effective. For best catalyst performance, the molar amounts of catalyst components added to the reaction mixture should provide a molar ratio of aluminum/vanadium (Al/V) of at least about 2. The preferred minimum Al/V is about 4. The maximum Al/V is based primarily on the considerations of catalyst expense and the desire to minimize the amount of chain transfer that may be caused by the organo-aluminum compound (as explained in detail below) Since, as is known certain organo-aluminum compounds act as chain transfer agents, if too much is present in the reaction mixture the $\overline{M}_w/\overline{M}_n$ of the copolymer may rise above 2. Based on these considerations, the maximum Al/V could be about 25, however, a maximum of about 17 is more preferred The most preferred maximum is about 15.

With reference again to processes for making copolymer in accordance with the present invention, it is well known that certain combinations of vanadium and aluminum compounds that can comprise the catalyst system can cause branching and gelation during the polymerization for polymers containing high levels of diene. To prevent this from happening Lewis bases such as ammonia, tetrahydrofuran, pyridine, tributylamine, tetrahydrothiophene, etc., can be added to the polymerization system using techniques well known to those skilled in the art.

Chain transfer agents for the Ziegler-catalyzed polymerization of alpha-olefins are well known and are illustrated, by way of example, by hydrogen or diethyl zinc for the production of EPM and EPDM. Such agents are very commonly used to control the molecular weight of EPM and EPDM produced in continuous flow stirred reactors For the essentially single active species Ziegler catalyst systems used in accordance with the present invention, addition of chain transfer agents to a CFSTR reduces the polymer molecular weight but does not affect the molecular weight distribution. On the other hand, chain transfer reactions during tubular reactor polymerization in accordance with the present invention broaden polymer molecular weight distribution and Inter-CD Thus the presence of chain transfer agents in the reaction mixture should be minimized or omitted altogether Although difficult to generalize for all possible reactions, the amount of chain transfer agent used should be limited to those amounts that provide copolymer product in accordance with the desired limits as regards MWD and compositional dispersity It is believed that the maximum amount of chain transfer agent present in the reaction mixture could be as high as about 0.2 mol/mol of transition metal, e.g., vanadium, again provided that the resulting copolymer product is in accordance with the desired limits as regards MWD and compositional dispersity. Even in the absence of added chain transfer agent, chain transfer reactions can occur because propylene and the organoaluminum cocatalyst can also act as chain transfer agents. In general, among the organo-aluminum compounds that in combination with the vanadium compound yield just one active species, the organoaluminum compound that gives the highest copolymer molecular weight at acceptable catalyst activity should be chosen. Furthermore, if the Al/V ratio has an effect on the molecular weight of copolymer product, that Al/V should be used which gives the highest molecular weight also at acceptable catalyst activity. Chain transfer with propylene can best be limited by avoiding excessively elevated temperature during the polymerization as described below.

Molecular weight distribution and Inter-CD are also broadened by catalyst deactivation during the course of the polymerization which leads to termination of growing chains. It is well known that the vanadium-based Ziegler catalysts used in accordance with the present invention are subject to such deactivation reactions which depend to an extent upon the composition of the catalyst. Although the relationship between active catalyst lifetime and catalyst system composition is not known at present, for any given catalyst, deactivation can be reduced by using the shortest residence time and lowest temperature in the reactor that will produce the desired monomer conversions.

Polymerizations in accordance with the present invention should be conducted in such a manner and under conditions sufficient to initiate propagation of essentially all copolymer chains simultaneously. This can be accomplished by utilizing the process steps and conditions described below.

The catalyst components are preferably premixed, that is, reacted to form active catalyst outside of the reactor, to ensure rapid chain initiation. Aging of the premixed catalyst system, that is, the time spent by the catalyst components (e.g., vanadium compound and organo-aluminum) in each other's presence outside of the reactor, should preferably be kept within limits If not aged for a sufficient period of time, the components will not have reacted with each other sufficiently to yield an adequate quantity of active catalyst species, with the result of nonsimultaneous chain initiation. Also, it is known that the activity of the catalyst species will decrease with time so that the aging must be kept below a maximum limit It is believed that the minimum aging period, depending on such factors as concentration of catalyst components, temperature and mixing equipment, could be as low as about 0.1 second. The preferred minimum aging period is about 0.5 second, while the most preferred minimum aging period is about 1 second. While the maximum aging period could be higher, for the preferred vanadium/organo-aluminum catalyst system the preferred maximum is about 200 seconds. A more preferred maximum is about 100 seconds. The most preferred maximum aging period is about 50 seconds. The premixing could be performed at low temperature such as 40° C. or below. It is preferred that the premixing be performed at 25° C. or below, with 20° C. or below being most preferred.

Preferably, the catalyst components are premixed in the presence of the selected polymerization diluent or solvent under rapid mixing conditions, e.g., at impingement Reynolds Numbers ($N_{RE}$) of at least 10,000, more preferably at least 50,000, and most preferably at least 100,000. Impingement Reynolds number is defined as $$N_{RE} = \frac{DN\rho}{\mu}$$

where N is fluid flow velocity (cm/sec), D is inside tube diameter (cm), $\rho$ is fluid density (g./cm$^3$) and $\mu$ is fluid viscosity (poise).

The temperature of the reaction mixture should also be kept within certain limits. The temperature at the reactor inlets should be high enough to provide complete, rapid chain initiation at the start of the polymerization reaction. The length of time the reaction mixture spends at high temperature must be short enough to minimize the amount of undesirable chain transfer and catalyst deactivation reactions.

Temperature control of the reaction mixture is complicated somewhat by the fact that the polymerization reaction generates large quantities of heat. This problem is, preferably, taken care of by using prechilled feed to the reactor to absorb the heat of polymerization. With this technique, the reactor is operated adiabatically and the temperature is allowed to increase during the course of polymerization. As an alternative to feed prechill, heat can be removed from the reaction mixture, for example, by a heat exchanger surrounding at least a portion of the reactor or by well-known autorefrigeration techniques in the case of batch reactors or multiple stirred reactors in series.

If adiabatic reactor operation is used the inlet temperature of the reactor feed could be about from −50° C. to 150° C. It is believed that the outlet temperature of the reaction mixture could be as high as about 200° C. The preferred maximum outlet temperature is about 70° C. The most preferred maximum is about 60° C. In the absence of reactor cooling, such as by a cooling jacket, to remove the heat of polymerization, it has been determined (for a midrange ethylene content EP copolymer and a solvent with heat capacity similar to hexane) that the temperature of the reaction mixture will increase from reactor inlet to outlet by about 13° C. per weight percent of copolymer in the reaction mixture (weight of copolymer per weight of solvent).

Having the benefit of the above disclosure, it would be well within the skill of the art to determine the operating temperature conditions for making copolymer in accordance with the present invention. For example, assume an adiabatic reactor and an outlet temperature of 35° C. are desired for a reaction mixture containing 5% copolymer. The reaction mixture will increase in temperature by about 13° C. for each weight percent copolymer or 5 wt %×13° C./wt. %=65° C. To maintain an outlet temperature of 35° C., it will thus require a feed that has been prechilled to 35° C.−65° C.=−30° C. In the instance that external cooling is used to absorb the heat of polymerization, the feed inlet temperature could be higher with the other temperature constraints described above otherwise being applicable.

Because of heat removal and reactor temperature limitations, the preferred maximum copolymer concentration at the reactor outlet is 25 wt./100 wt. diluent. The most preferred maximum concentration is 15 wt/100 wt. There is no lower limit to concentration due to reactor operability, but for economic reasons it is preferred to have a copolymer concentration of at least 2 wt/100 wt. Most preferred is a concentration of at least 3 wt/100 wt.

The rate of flow of the reaction mixture through the reactor should be high enough to provide good mixing of the reactants in the radial direction and minimize mixing in the axial direction. Good radial mixing is beneficial not only to both the Intra- and Inter-CD of the copolymer chains but also to minimize radial temperature gradients due to the heat generated by the polymerization reaction. Radial temperature gradients in the case of multiple segment polymers will tend to broaden the molecular weight distribution of the copolymer since the polymerization rate is faster in the high temperature regions resulting from poor heat dissipation. The artisan will recognize that achievement of these objectives is difficult in the case of highly viscous solutions. This problem can be overcome to some extent through the use of radial mixing devices such as static mixers (e.g., those produced by the Kenics Corporation).

It is believed that residence time of the reaction mixture in the mix-free reactor can vary over a wide range. It is believed that the minimum could be as low as about 0.2 second. A preferred minimum is about 0.5 second. The most preferred minimum is about 1 second. It is believed that the maximum could be as high as about 3600 seconds. A preferred maximum is about 40 seconds. The most preferred maximum is about 20 seconds.

Preferably, the fluid flow of the polymerization reaction mass through the tubular reactor will be under turbulent conditions, e.g., at a flow Reynolds Number (NR) of at least 10,000, more preferably at least 50,000 and most preferably at least 100,000 (e.g., 150,000 to 250,000), to provide the desired radial mixing of the fluid in the reactor. Flow Reynolds Number is defined as $$NR = \frac{D'N\rho}{\mu}$$

wherein N, is fluid flow velocity (cm/sec), D' is inside tube diameter of the reactor (cm), $\rho$ is fluid density (g/cm$^3$) and $\mu$ is fluid viscosity (poise).

If desired, catalyst activators for the selected vanadium catalysts can be used as long as they do not cause the criteria for a mix-free reactor to be violated, typically in amounts up to 20 mol %, generally up to 5 mol %, base d on the vanadium catalyst, e.g., butyl perchlorocrotonate, benzoyl chloride, and other activators disclosed in Ser. Nos. 50,945 and 50,946, filed May 15, 1987, the disclosures of which are hereby incorporated by reference in their entirety. Other useful catalyst activators include esters of halogenated organic acids, particularly alkyl trichloroacetates, alkyl tribromoacetates, esters of ethylene glycol monoalkyl (particularly monoethyl) ethers with trichloroacetic acid and alkyl perchlorocrotonates, and acyl halides. Specific examples of these compounds include benzoyl chloride, methyl trichloroacetate, ethyl trichloroacetate, methyl tribromoacetate, ethyl tribromoacetate, ethylene glycol monoethyl ether trichloroacetate, ethylene. glycol monoethyl ether tribromoacetate, butyl perchlorocrotonate and methyl perchlorocrotonate.

With reference to the accompanying drawings, particularly FIG. 1, reference numeral 1 generally refers to a premixing device for premixing the catalyst components. For purposes of illustration, it is assumed that a copolymer of ethylene and propylene (EPM) is to be produced using as catalyst components vanadium tetrachloride and ethyl aluminum sesquichloride The polymerization is an adiabatic, solution polymerization process using hexane solvent for both the catalyst system and the reaction mixture.

The premixing device 1 comprises a temperature control bath 2, a fluid flow conduit 3 and mixing device 4 (e.g., a mixing tee). To mixing device 4 are fed hexane solvent, vanadium tetrachloride and ethyl aluminum sesquichloride through feed conduits 5,6 and 7, respectively. Upon being mixed in mixing device 4, the resulting catalyst mixture is caused to flow within conduit 3, optionally in the form of a coiled tube, for a time long enough to produce the active catalyst species at the temperature set by the temperature bath. The temperature of the bath is set to give the desired catalyst solution temperature in conduit 3 at the outlet of the bath.

Upon leaving the premixing device, the catalyst solution flows through conduit 8 into mixing zone 9 to provide an intimate mixing with hexane solvent and reactants (ethylene and propylene) which are fed through conduit 10. Any suitable mixing device can be used, such as a mechanical mixer, orifice mixer or impingement mixing tee. For economic reasons, the mixing tee is preferred. Streams 8 and 10 are fed directly to the inlet of reactor 12 with flow rates high enough to accomplish the desired level of intimate mixing. The hexane with dissolved monomers may be cooled upstream of mixing zone 9 to provide the desired feed temperature at the reactor inlet.

Tubular reactor 12 is provided with intermediate feed points 13-15 where additional monomers (e.g., ethylene and propylene as shown) and/or hexane can be fed to the reactor. (It will be understood that the reactor can be provided with 1 or more (e.g., 2-10) such intermediate feed points.) While the reactor can be operated adiabatically, if desired or necessary to maintain reaction mixture temperature within desired limits, external cooling means such as a cooling jacket surrounding at least a portion of the reactor system 12 can be provided.

After polymerization, the polymerization is rapidly quenched (15a) at the exit of (or at the terminal end of) the reactor. This quenching can be accomplished by the introduction into the polymerization reaction mixture (e.g., in the reactor or into polymerization product effluent stream) of water, lower alkanol, or aqueous acid (e.g., aqueous HCl) as quench liquid, generally using from 1 to 30 moles of quench liquid per mole of total V and Al in the reaction mixture.

Figure 2:
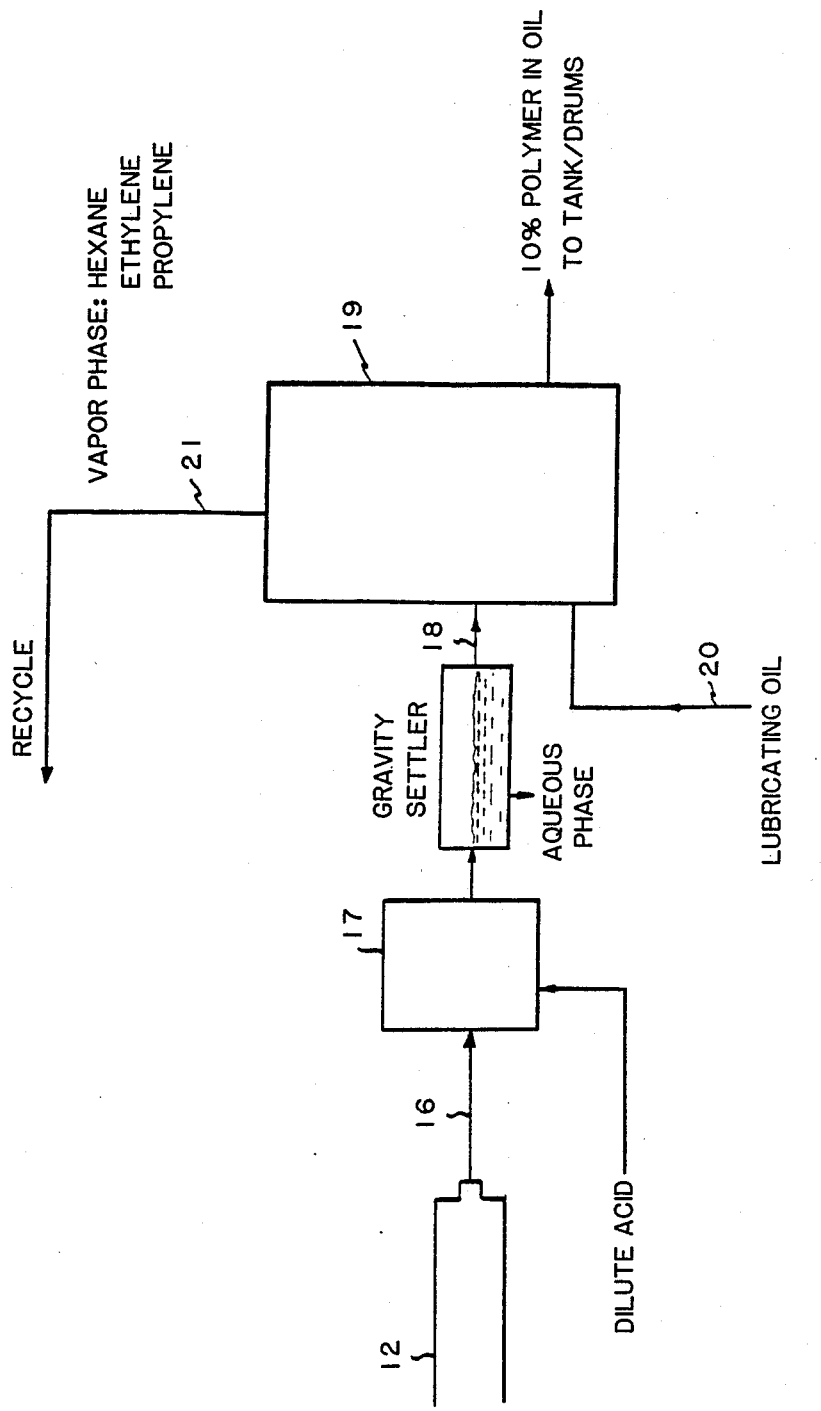
FIG. 2 schematically illustrates how the process depicted in FIG. 1 can be integrated into a lube oil additive process.

With reference to FIG. 2 which schematically illustrates a process for mixing copolymer with lube oil, quenched polymerization product from reactor 12 is fed through conduit 16 to deashing section 17 wherein catalyst residues are removed from the reaction mixture in a known manner (known as deashing). The vanadium and aluminum compound residues can be removed by reacting them with water to form hydrocarbon-insoluble hydroxides and then extracting the hydroxides into dilute acid or water. If desired, other conventional deashing aqueous liquids can be used, e.g., aqueous solutions containing mineral acids (e.g., HCl, HBr, $HNO_3$, $H_2SO_4$, $H_3PO_4$, and the like), aqueous solutions containing mineral bases (e.g., caustic ammonia, sodium methoxide and the like) or mixtures thereof.

After separating the aqueous and hydrocarbon phases, for instance in a gravity settler, the polymer solution, which primarily contains solvent, unreacted monomers and copolymer product (EPM) is fed through conduit 18 to lube oil mixing tank 19. Of course, tank 19 could be a staged series of tanks. Hot lube oil is fed through conduit 20 to mixing tank 19, wherein the remaining reaction mixture is heated up such that the remaining hexane and unreacted monomers are vaporized and removed through recycle conduit 21 through which they flow back for reuse in premixing device 1 following suitable purification to remove any catalyst poisons The copolymer product, being hydrocarbon-soluble, is now present in the lube oil and is removed from tank 19 as a copolymer-in-oil solution.

Alternatively, the copolymer solution from the gravity settler can be steam distilled with subsequent extrusion drying of the polymer and then mixed with a hydrocarbon mineral oil diluent to produce an oil additive concentrate or lube oil additive

Having thus described the above illustrative reactor system, it will readily occur to the artisan that many variations can be made within the scope of the present invention. For example, the placement and number of multiple feed sites, the choice of temperature profile during polymerization and the concentrations of reactants can be varied to suit the end-use application.

By practicing processes in accordance with the present invention, alpha-olefin copolymers having very narrow MWD can be made by direct polymerization. Although narrow MWD copolymers can be made using other known techniques, such as by fractionation or mechanical degradation, these techniques are considered to be impractical to the extent of being unsuitable for commercial-scale operation. As regards EPM and EPDM made in accordance with the present invention, the products have good shear stability and (with specific intramolecular CD) excellent low temperature properties which make them especially suitable for lube oil applications.

A lubricating oil composition in accordance with the present invention comprises a major amount of basestock lubricating oil (lube oil) of lubricating viscosity which contains an effective amount of viscosity modifier being a copolymer of ethylene and at least one other alpha-olefin as described in detail above More specifically, the copolymer should have a MWD characterized by at least one of a ratio of $\overline{M}_w/\overline{M}_n$ of less than 2 and a ratio of $\overline{M}_z/\overline{M}_w$ of less than 1.8. The preferred ratio of $\overline{M}_w/\overline{M}_n$ is less than about 1.6, with less than about 1 4 being preferred. The preferred $\overline{M}_z/\overline{M}_w$ is less than about 1.5, with less than about 1.3 being most preferred.

It is preferred that the Intra-CD of the copolymer is such that at least two portions of an individual intramolecularly heterogeneous chain, each portion comprising at least 5 weight percent of said chain, differ in composition from one another by at least 5 weight percent ethylene. The Intra-CD can be such that at least two portions of copolymer chain differ by at least 10 weight percent ethylene Differences of at least 20 weight percent, as well as, 40 weight percent ethylene are also considered to be in accordance with the present invention.

It is also preferred that the Inter-CD of the copolymer is such that 95 wt. % of the copolymer chains have an ethylene composition that differs from the copolymer average weight percent ethylene composition by 15 wt. % or less. The preferred Inter-CD is about 13% or less, with the most preferred being about 10% or less.

In a most preferred embodiment, the copolymer has all of the $\overline{M}_wD$, Intra-CD and Inter-CD characteristics described above when incorporated in a lubricating oil or oil additive concentrate composition. In current practice, ethylene-propylene copolymer is most preferred. The preferred average ethylene content of the copolymer, on a weight basis, for use as a lube oil additive is about from 35% to 75%.

For lube oil additive applications, it is believed that the copolymer could have a weight-average molecular weight as low as about 5,000. The preferred minimum is about 15,000 with about 50,000 being the most preferred minimum It is believed that the maximum weight-average molecular weight could be as high as about 500 000. The preferred maximum is about 300,000, with about 250,000 being the most preferred maximum These limits are controlled by the contemporary marketplace requirements for shear stability.

Copolymers of this invention may be employed in lubricating oils as viscosity index improvers or viscosity modifiers in amounts varying broadly from about 0.001 to 49 wt. %. The proportions giving the best results will vary somewhat according to the nature of the lubricating oil basestock and the specific purpose for which the lubricant is to serve in a given case. When used as lubricating oils for diesel or gasoline engine crankcase lubricants, the polymer concentrations are within the range of about 0.1 to 15.0 wt % of the total composition which are amounts effective to provide viscosity modification and/or VI improvement. Typically such polymeric additives are sold as oil additive concentrates wherein the additive is present in amounts of about 2 to 50 wt %, preferably about 5 to 25 wt % based on the total amount of hydrocarbon mineral oil diluent for the additive. The polymers of this invention are typically used in lubricating oils based on a hydrocarbon mineral oil having a viscosity of about 2–40 centistokes (ASTM D-445) at 100° C., but lubricating oil basestocks comprised of a mixture of a hydrocarbon mineral oil and up to about 50 wt % of a synthetic lubricating oil such as esters of dibasic acids and complex esters derived from monobasic acids, polyglycols, dibasic acids and alcohols are also considered suitable.

Finished lubricating oils containing the ethylene-alpha-olefin polymers of the present invention will typically contain a number of other conventional additives in amounts required to provide their normal attendant functions and these include ashless dispersants, metal or overbased metal detergent additives, zinc dihydrocarbyl dithiophosphate (or other) anti-wear additives, other viscosity modifiers, anti-oxidants, pour depressants, lube oil flow improvers, rust inhibitors, fuel economy or friction reducing additives and the like. The ashless dispersants include the polyalkenyl or borated polyalkenyl succinimides where the alkenyl group if derived from a $C_2$-$C_{10}$ olefin, especially polyisobutenyl having a number average molecular weight of about 700 to 5,000. Other well known dispersants include the oil soluble polyesters of hydrocarbon substituted succinic anhydride, e.g., polyisobutenyl succinic anhydride and the oil soluble oxazoline and lactone oxazoline dispersants derived from hydrocarbon substituted succinic anhydride and di-substituted amino alcohols. Also useful as dispersants are long chain aliphatic hydrocarbons having a polyamine attached directly thereto and Mannich condensation products formed by condensing about a molar proportion of long chain hydrocarbon substituted phenol with about 1 to 2.5 moles of formaldehyde and about 0.5 to 2 moles of polyalkylene polyamine, wherein the long chain hydrocarbon is a polymer of a $C_2$ to $C_{10}$ (e.g., $C_2$ to $C_5$, monoolefin and the polymer has a number average molecular weight of from about 700 to 5,000. Lubricating oils typically contain about 0.5 to 8 wt. % of ashless dispersant.

The metal detergent additives suitable in the oil are known in the art and include one or more members selected from the group consisting of overbased oil-soluble calcium, magnesium and barium phenates, sulfurized phenates, sulfonates, and salicylates, especially the sulfonates of $C_{16}$-$C_{50}$ alkyl substituted benzene or toluene sulfonic acids which have a total base number of about 80 to 300. These overbased materials may be used as the sole metal detergent additive or in combination with the same additives in the neutral form but the overall metal detergent additive combination should have a basicity as represented by the foregoing total base number. Preferably they are present in amounts of from about 0.5 to 8 wt. % with a mixture of overbased magnesium sulfurized phenate and neutral calcium sulfurized phenate, obtained from $C_8$ to $C_{12}$ alkyl phenols being especially useful.

The anti-wear additives useful are the oil-soluble zinc dihydrocarbyldithiophosphate having a total of at least 5 carbon atoms, preferably alkyl groups of $C_4$-$C_8$, or alkaryl groups of 7 to 19 carbon atoms, typically used in amounts of about 0.5-6% by weight.

Other suitable conventional viscosity index improvers, or viscosity modifiers, are the olefin polymers such as other ethylene-propylene copolymers (e.g., those disclosed in the prior art as discussed above), polybutene, hydrogenated polymers of isoprene or butadiene and copolymers and terpolymers of styrene with isoprene and/or butadiene, polymers of alkyl acrylates or alkyl methacrylates, copolymers of alkyl methacrylates with N-vinyl pyrrolidone or dimethylaminoalkyl methacrylate, post-grafted polymers of ethylene-propylene with an active monomer such as maleic anhydride which may be further reacted with alcohol or an alkylene polyamine, styrene-maleic anhydride polymers post-reacted with alcohols and amines, ethylene-propylene copolymers grafted with N-vinyl pyrrolidone, 2-vinyl pyridine or other suitable polar monomer, or hydrogenated styrene-isoprene and hydrogenated styrene-butadiene polymers functionalized with such polar groups, and the like. These are used as required to provide the viscosity range desired in the finished oil, in accordance with known formulating techniques, and generally within the limitations specified in SAE J300.

Examples of suitable oxidation inhibitors are hindered phenols, such as 2,6-ditertiary-butyl-paracresol, amines, sulfurized phenols and alkyl phenothiazines; usually a lubricating oil will contain about 0.01 to 3 weight percent of oxidation inhibitor depending on its effectiveness.

Rust inhibitors are employed in very small proportions such as about 0.1 to 1 weight percent with suitable rust inhibitors being exemplified by $C_9$-$C_{30}$ aliphatic succinic acids or anhydrides such as dodecenyl succinic anhydride.

Antifoam agents are typically the polysiloxane silicone polymers present in amounts of about 0.001 to 1 weight percent. Pour point depressants and lube oil flow improvers are used generally in amounts of from about 0.01 to about 10.0 wt. %, more typically from about 0.01 to about 1 wt. %, for most mineral oil basestocks of lubricating viscosity. Illustrative of pour point depressants and lube oil flow improvers which are normally used in lubricating oil compositions are polymers and copolymers of n-alkyl meth-acrylate and n-alkyl acrylates, copolymers of di-n-alkyl fumarate and vinyl acetate, alpha-olefin copolymers, alkylated naphthalenes, copolymers or terpolymers of alpha-olefins and styrene and/or alkyl-styrene, styrene dialkyl maleic copolymers and the like.

As used herein, the following terms have the indicated meanings:

Thickening efficiency (T.E.) is defined as the ratio of the weight percent of a polyisobutylene (sold as an oil solution by Exxon Chemical Company as Paratone N), having a Staudinger molecular weight of 20,000, required to thicken a solvent-extracted neutral mineral lubricating oil, having a viscosity of 150 SUS at 37.8° C., a viscosity index of 105 and an ASTM pour point of 0.F (Solvent 150 Neutral) to a viscosity of 12.4 centistokes at 98.9° C. to the weight percent of a test copolymer required to thicken the same oil to the same viscosity at the same temperature. For linear polymers of a given ethylene content, the thickening efficiency is approximately proportional to the 0.75 power of the weight-average molecular weight.

Low temperature properties of the lubricating oils of the present invention are evaluated by a number of significant tests:

MRV (Mini Rotary Viscometer), using a technique described in ASTM-D3829, measures viscosity in centipoise and yield stress in Pascals. MRV was determined at −25° C.

CCS (Cold Cranking Simulator), using a technique in ASTM-D2602, a high shear viscosity measurement in centipoises. This test is related to a lubricating oil's resistance to cold engine starting.

Pour point, ASTM D97, measured in degrees centigrade.

TP1 cycle MRV—Determined by ASTM D4684. This is essentially the same as the ASTM MRV noted above, except a slow cooling cycle is used. The cycle is defined in SAE Paper No 850443, K. O. Henderson et al.

Percent crystallinity can be measured by a variety of techniques, as defined in G. Ver Strate, Z. W. Wilchinsky, *J. Pol. Sci. Physics*, A2, 9, 127 (1971), which is incorporated herein by reference The degree of crystallinity measured is a function of the sample's annealing history. Some low amount is desirable in this product when the sample is annealed at 20° C. for more than 48 hours after preparation of a void-free, strain-free specimen by heating to 150° C. for 30 minutes in a suitable mold.

Figure 5:
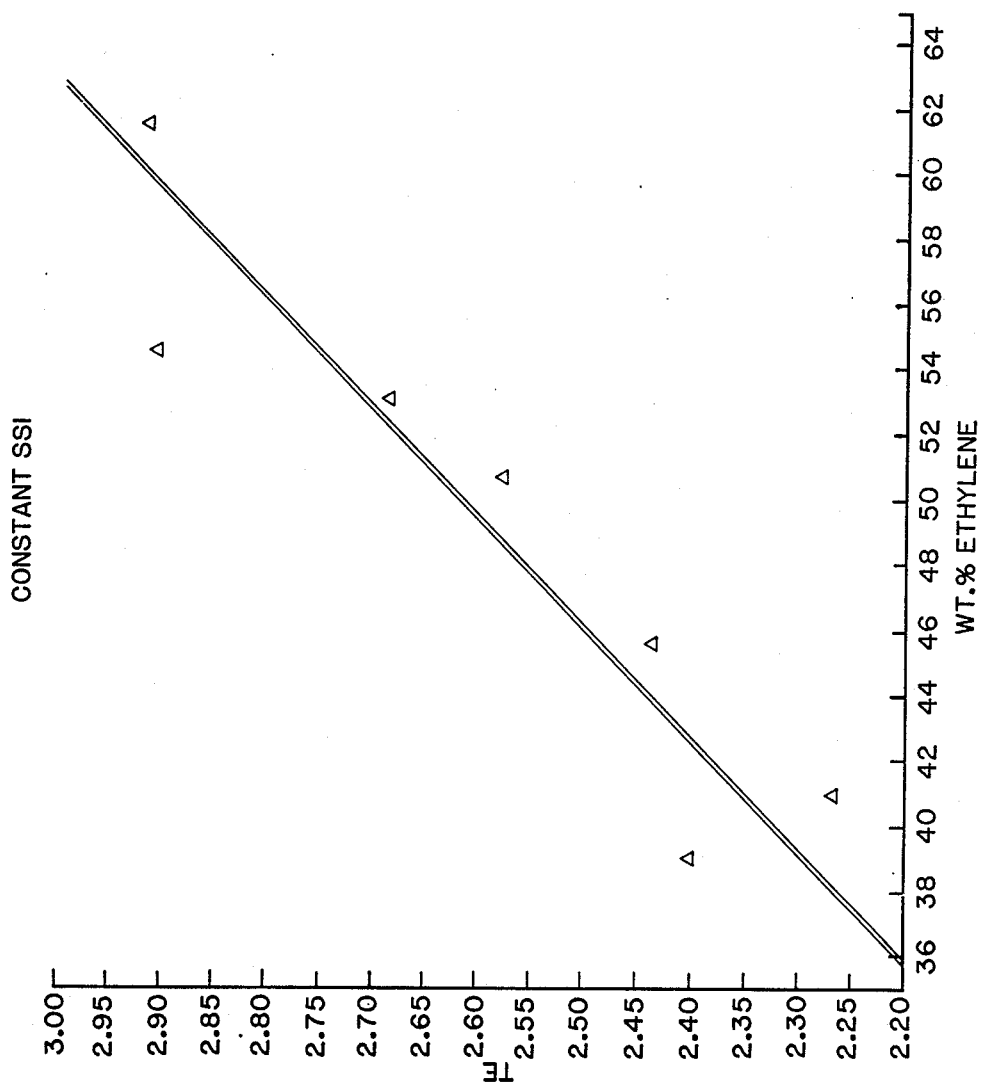
FIGS. 5 and 6 are graphic illustrations of TE-SSI and CCS versus ethylene content, as obtained in Example 6.

It is well known that homogeneous intra-CD EP copolymers made with vanadium catalysts become semicrystalline in the 55–65 wt. % ethylene region. [See, *Encyclopedia of Polymer Science*, cited above, at FIG. 5 thereof.] If one of the segmented polymers of the present invention shows a finite degree of crystallinity, the crystallinity must arise from that portion of the chain which is high in ethylene. It is not possible to measure independently the crystallinity on a segment of a chain when it is connected to noncrystalline portions. It must be inferred that the crystallinity arises from the high ethylene portions.

Shear stability index (SSI) measures the mechanical stability of polymers used as V.I. improvers in crankcase lubricants subjected to high strain rates. The diesel fuel injector test was used (CEC L-14-A-79; equivalent to DIN 51382) To determine SSI, the polymer under test is dissolved in a suitable base oil (for example, a solvent extracted 150 neutral) to a relative viscosity of 2 to 3 at 100° C. The oil solution is then circulated through a diesel fuel injector, for a total of thirty passes. The SSI is calculated from the initial 100° C. kinematic viscosity ($V_i$), the final kinematic viscosity ($V_f$), and the base oil viscosity ($V_b$) as SSI (%)=100×($V_i-V_f$)/($V_i-V_b$). A reference sample (as required by the DIN method) is used to calibrate the test.

Filterability—Cummins-Fleetguard Water Tolerance Test, as defined in SAE Paper No. 870645. The test requires filtration of 200 ml. of a formulated oil at room temperature through the 5 micron pore size automotive filter. Passing performance is obtained with flow rates of at least 4 ml/min and with a maximum filter weight gain of 20 mg.

In the following examples, $\overline{M}_w$ and $\overline{M}_z/\overline{M}_w$ values were determined by GPC/LALLS using total scattered light intensity in 1,2,4 trichlorobenzene at 135° C., employing a Chromatix KMX-6 scattering photometer: specific refractive index increment dn/dc is −0.104 (g/cc)-1. $\overline{M}_w/\overline{M}_n$ values were determined from an elution time-molecular weight relationship as discussed in the specification, data precision ±15. Ethylene content (wt. %) was determined using infrared analysis by ASTM D-3900 Method A, accurate to +2% ethylene. Compositional distribution was determined on fractions which comprise 5–20% of the original polymer weight, hexane/isopropyl alcohol is used as the solvent/non solvent pair. Inter-CD is determined as the compositional range that includes 95 wt. % of the polymer. Intra-CD is determined by fragmenting chains to ca. 5% of their original molecular weight. Intra-CD is determined as the difference in composition between the highest ethylene fractions of the original and fragmented chains and between the lowest such fractions.

Intra-CD is also evaluated from the adiabatic polymerization $\Delta T$, the reactivity ratios and the heats of polymerization as given in the specification.

EXAMPLE 1 FOR COMPARISON

In this example, a series of ethylene-propylene copolymers of differing ethylene content were prepared in a conventional continuous flow stirred tank reactor. These polymers are typical of prior art viscosity modifier technology. These serve as reference data. (Samples of copolymers in Runs 1-3 and 1-4 are commercially available.) Catalyst, monomers and solvent were fed to a 3 gallon reactor at rates shown in the accompanying Table I. Hexane was purified prior to use by passing over 4A molecular sieves (Union Carbide, Linde Div. 4A 1/16" pellets) and silica gel (W. R. Grace Co., Davison Chemical Div., PA-400 20–40 mesh) to remove polar impurities which act as catalyst poisons. Gaseous ethylene and propylene were passed over hot (270° C.) $Cu_2O$ (Harshaw Chemical Co., CU1900 ¼" spheres) to remove oxygen followed by molecular sieve treatment (as above) for water removal. The monomers were then combined with the hexane upstream of the reactor and passed through a chiller which provided a low enough temperature to completely dissolve the monomers in the hexane. Polymerization temperature was controlled by adjusting the feed temperature and running the reactor adiabatically with the feed absorbing heat of reaction generated by the polymerization. The reactor outlet pressure was controlled at 413 kPa to ensure dissolution of the monomers and a liquid filled reactor.

Catalyst solution was prepared by dissolving 37.4 g. of $VCl_4$ in 7 l. of purified n-hexane. Cocatalyst consisted of 96.0 g $Al_2Et_3Cl_3$ in 7 l, of n-hexane. These solutions were fed to the reactor at rates shown in Table IA. For the case of catalyst premixing the two solutions were premixed at 0° C. for 10 seconds prior to entry into the reactor.

Copolymer was deashed by contacting with dilute aqueous HCl and recovered by steam distillation of the diluent with mill drying of the product to remove residual volatiles. The polymers were stabilized with 0.1 wt. % Irganox 1076, a hindered phenol anti-oxidant (Ciba Geigy). The product so prepared was analyzed for composition, and molecular weight distribution using the techniques discussed in the specification. Results were as in Table IA.

The copolymers were essentially compositionally homogeneous with heterogeneity ±3% about the average, i.e., nearly within experimental error of being completely homogeneous.

These results indicate that for copolymer made in a continuous flow stirred reactor the $\overline{M}_w/\overline{M}_n$ was about 2. Since in a backmixed reactor the monomer concentrations are constant, the Intra-CD was less than 5% ethylene. Catalyst premixing and the presence of hydrogen have no effect on $\overline{M}_w/\overline{M}_n$ in a backmixed reactor. Experiments over a range of polymerization conditions with the same catalyst system produced polymers of similar structure.

(In the Examples, "sesqui" means ethyl aluminum sesquichloride.)

TABLE IA

|  | Copolymer Run 1-1 | Copolymer Run 1-2 | Copolymer Run 1-3 | Copolymer Run 1-4 |
|---|---|---|---|---|
| Reactor Feed Temp. (°C.) | −30 | −25 | −40 | −40 |
| Reactor Temp. (°C.) | 35 | 35 | 55 | 38 |

TABLE IA-continued

|  | Copolymer Run 1-1 | Copolymer Run 1-2 | Copolymer Run 1-3 | Copolymer Run 1-4 |
|---|---|---|---|---|
| Reactor Feed Rates * = (g/100 g. hexane) |  |  |  |  |
| Hexane (kg/hr) | 40 | 40 | 38 | 48 |
| Ethylene (*) | 3.4 | 3.4 | 5.4 | 3.0 |
| Propylene (*) | 2.9 | 2.4 | 5.0 | 10 |
| $VOCl_3$/sesqui (*) | .0095 | .0095 | .011 | .01 |
| Al/V (molar) | 5:1 | 5:1 | 5:1 | 5:1 |
| $H_2$ ppm on $C_2$= | 25 | 15 | 100 | 50 |
| Reactor Residence Time (min) | 10 | 10 | 11 | 8 |
| Cement concentration (g/100 g hexane) | 6.0 | 5.7 | 7.3 | 7.0 |
| Catalyst Efficiency (g polymer/g $VOCl_3$) | 635 | 600 | 700 | 700 |
| $(\overline{M}_w) \times 10^4$ | 1.55 | 1.5 | .13 | 1.55 |
| $(\overline{M}_w/\overline{M}_n)$ | 2.2 | 2.2 | 2.2 | 2.2 |
| $(\overline{M}_z/\overline{M}_w)$ | 1.8 | 1.8 | 1.8 | 1.8 |
| Average Composition (Ethylene wt. %) | 52 | 58 | 67 | 43 |
| Intermolecular Composition Distribution (%) | ±3 | ±3 | ±3 | ±3 |
| Crystallinity (%) | 0 | 0 | 1 | 0 |

$$\left( \frac{\Delta Hf \, cal/g.}{69} \times 100 \right)$$

The CFSTR copolymers so prepared were then tested for their viscometric properties, by dissolving 0.95 gm of each copolymer in 100 gms of S150N (Mid-Continent) basestock mineral oil containing 0.4 wt. % of a commercial lube oil pour depressant (fumarate vinyl acetate; Paraflow 449, Exxon Chemical Co.) to make SAE 10W-40 oils. The resulting lube oil compositions were then tested to determine CCS viscosities (at −20° C.) and MRV viscosities (at −25° C.). The data thereby obtained are summarized in Table IB below.

TABLE IB

| Run No. | Ethylene wt. % | TE | CCS (cP) | MRV (cP) | Pour Point (°C.) | Filterability | SSI |
|---|---|---|---|---|---|---|---|
| 1-1 | 52 | 2.8 | VE | 32,000 | −26.1 | Pass | 41 |
| 1-2 | 58 | 2.8 | VE | >10⁶ | −12.2 | Pass | 37.5 |
| 1-3 | 67 | 3.0 | VE | 15,000 | −12.2 | Fail | 32.5 |
| 1-4 | 43 | 2.8 | 3100 | 20,000 | −31.7 | Pass | 48 |

In the above table, "VE" (as defined in ASTM D2602) means the copolymers exhibited a strong viscoelastic response in the CCS test, making it impossible to determine CCS viscosity. This is unacceptable for VI improvers.

Polymers 1-1 and 1-2 have unacceptably high MRV viscosities. The SAE J300 requirement for 10W-X oils is MRV viscosity less than 30,000 cP at −25° C. Polymers 1-1, 1-2, and 1-3 all have unacceptably high pour points, 10W-X oils should have a maximum pour point of −30° C. The oil prepared from Sample 1-3 fails the Cummins-Fleetguard filter test because it completely plugs the filter after only 8 ml of oil has been filtered.

It is apparent from these properties that conventional technology polymers of above 5 wt. % in average ethylene content are not acceptable as viscosity modifiers.

EXAMPLE 2 FOR COMPARISON

This example demonstrates the effect of ethylene content on TE-SSI, CCS, MRV and filterability performance. The polymers were all prepared in a backmixed reactor and data are set forth in Table II below.

Figure 6:
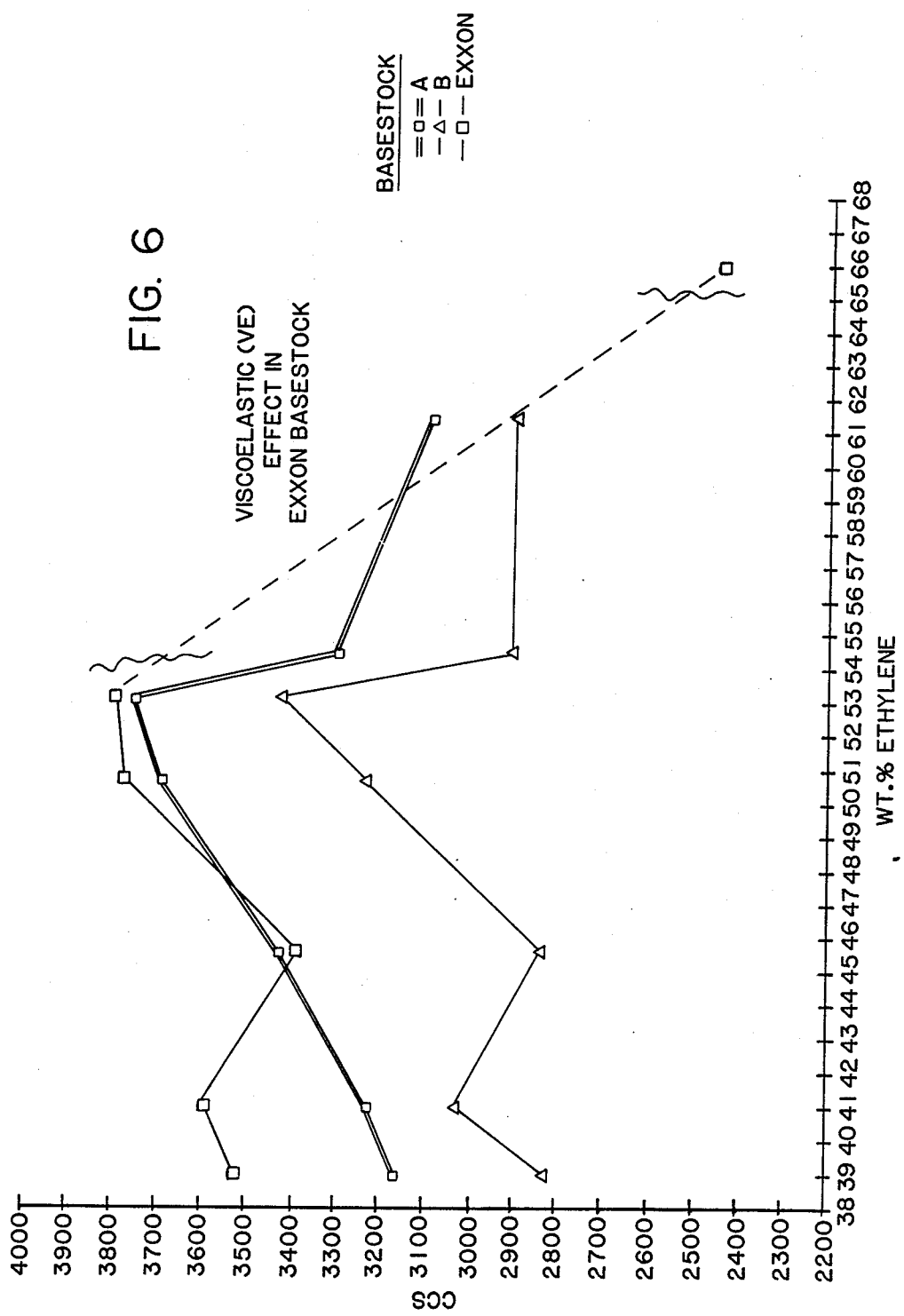
Figure 7:
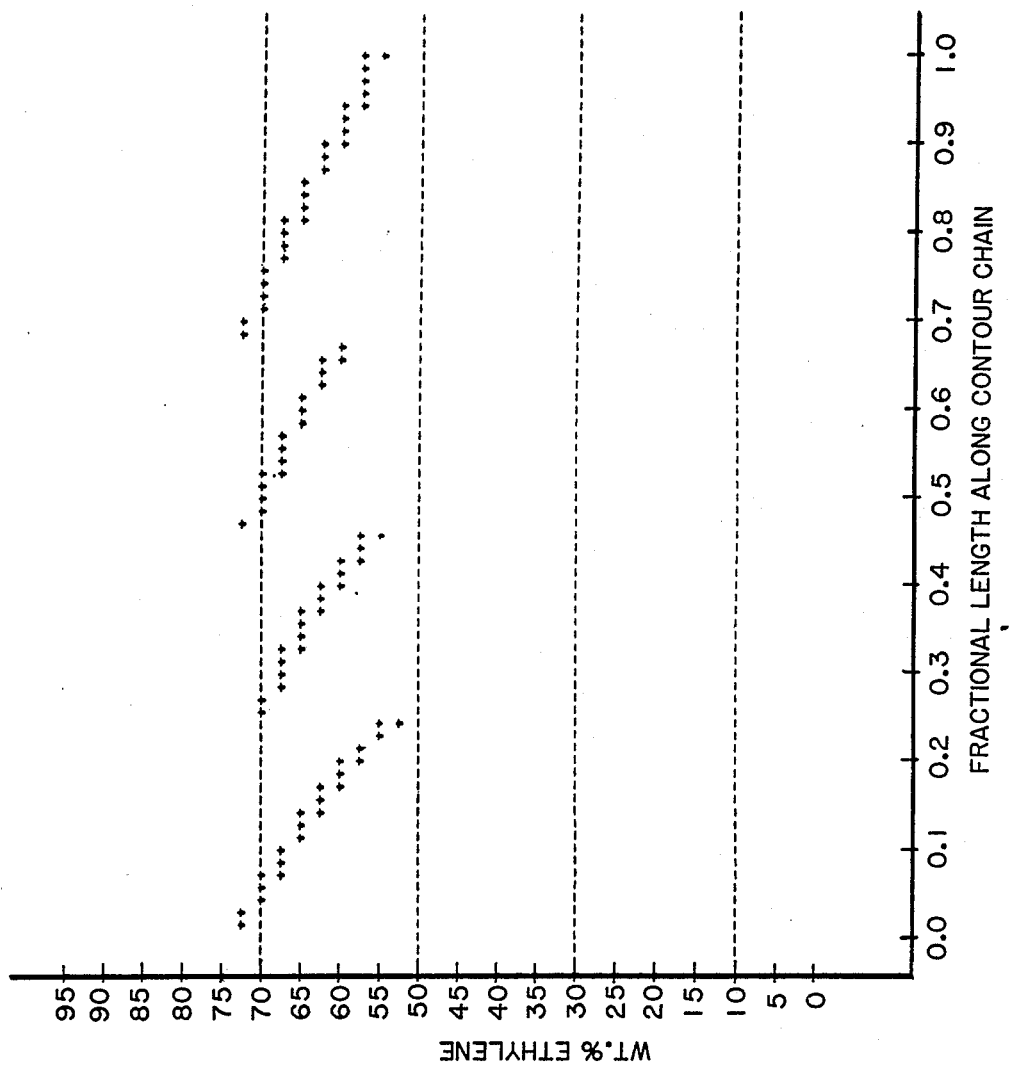
Figure 8:
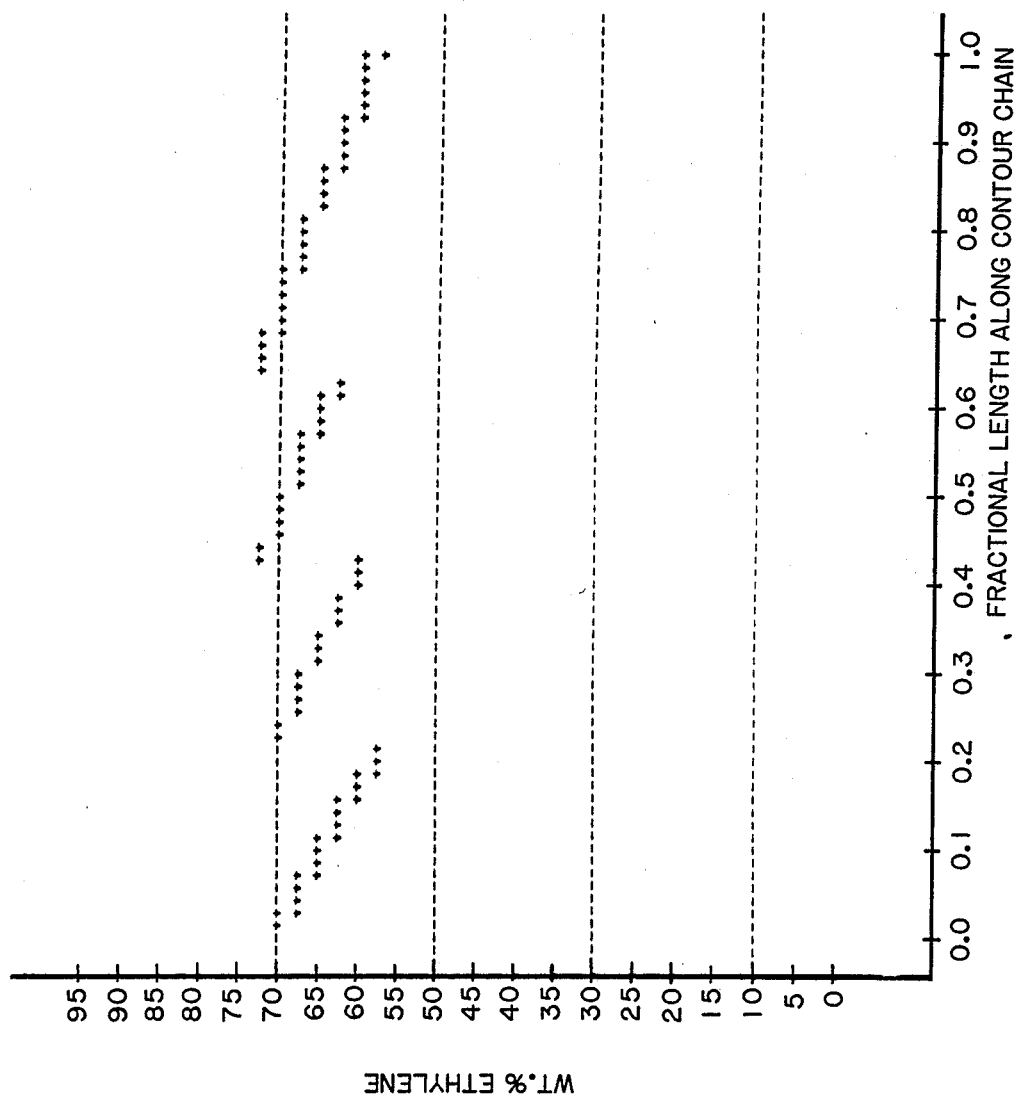
Figure 9:
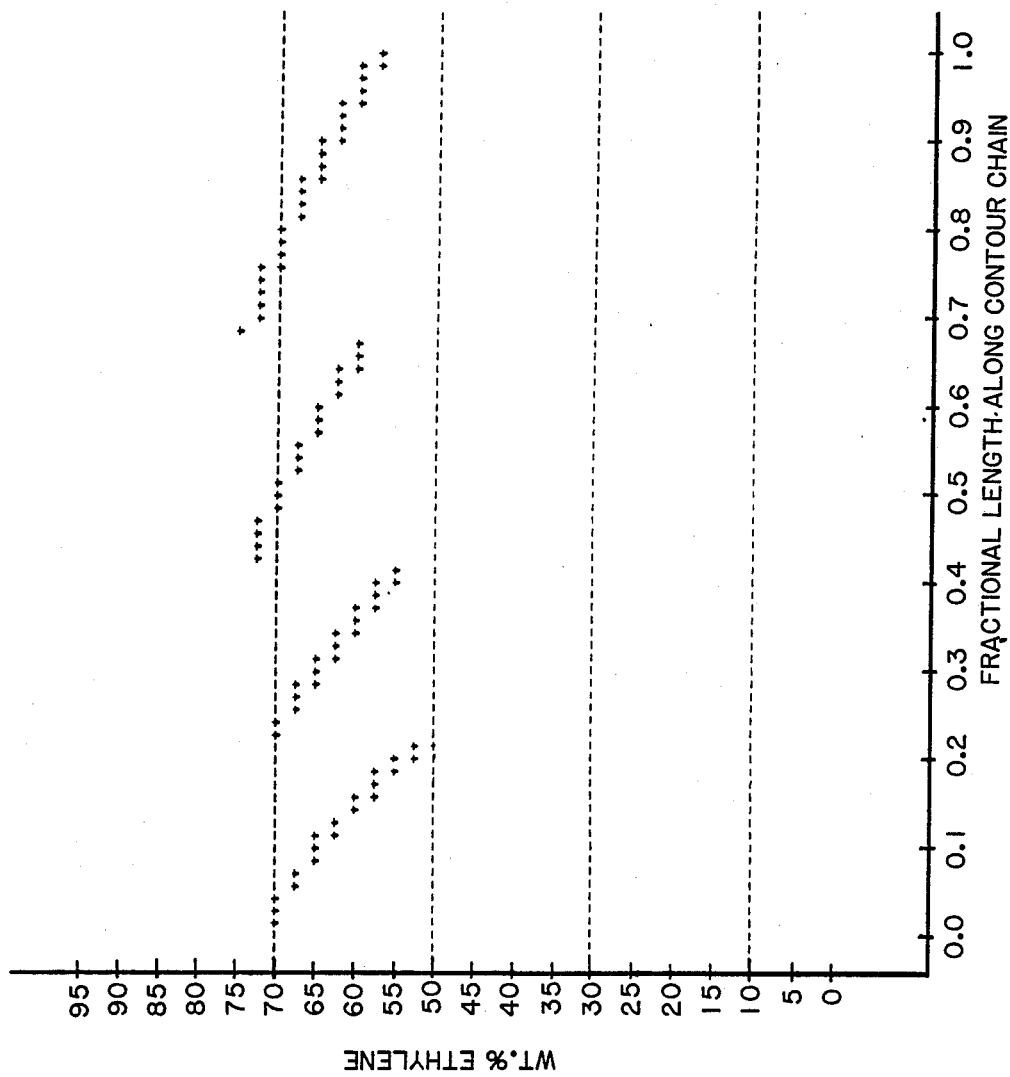
Figure 10:
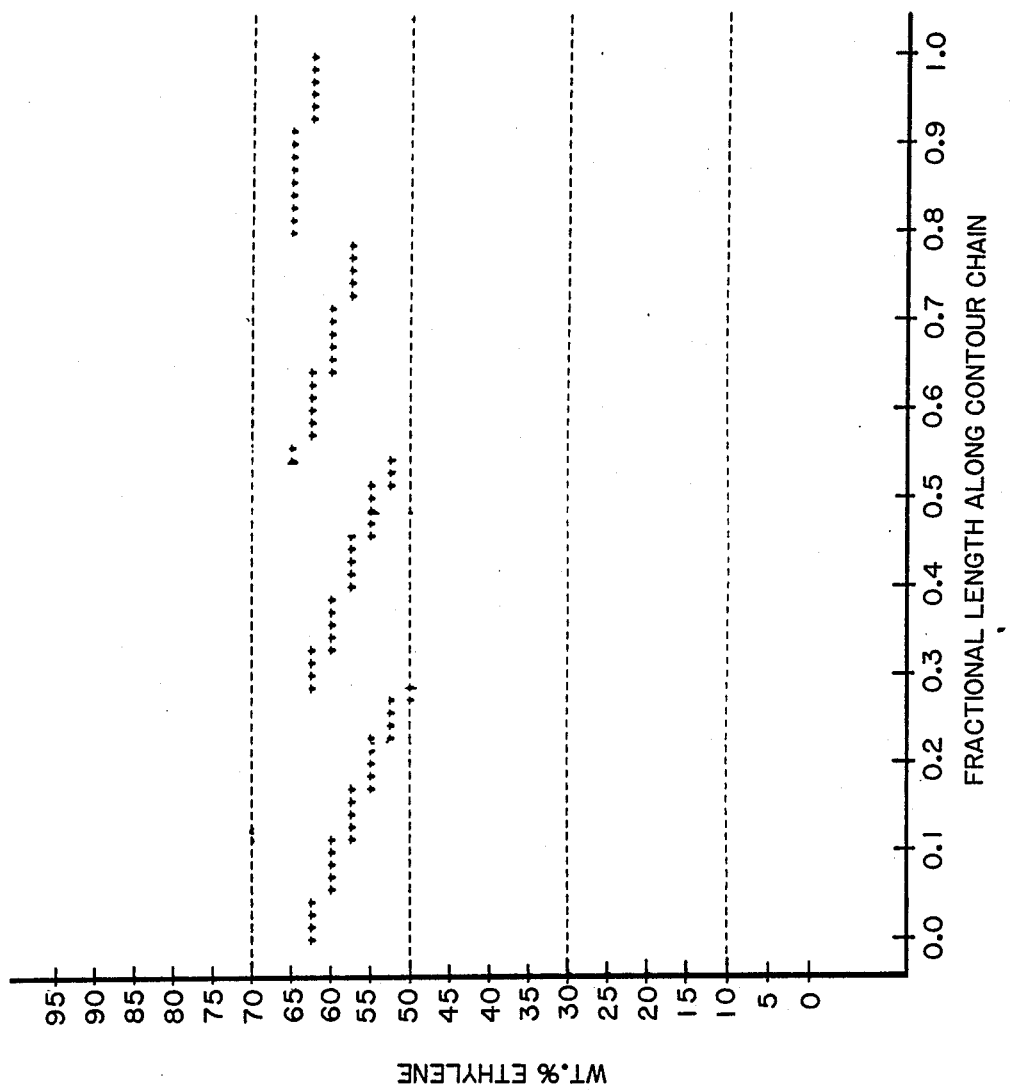
Figure 11:
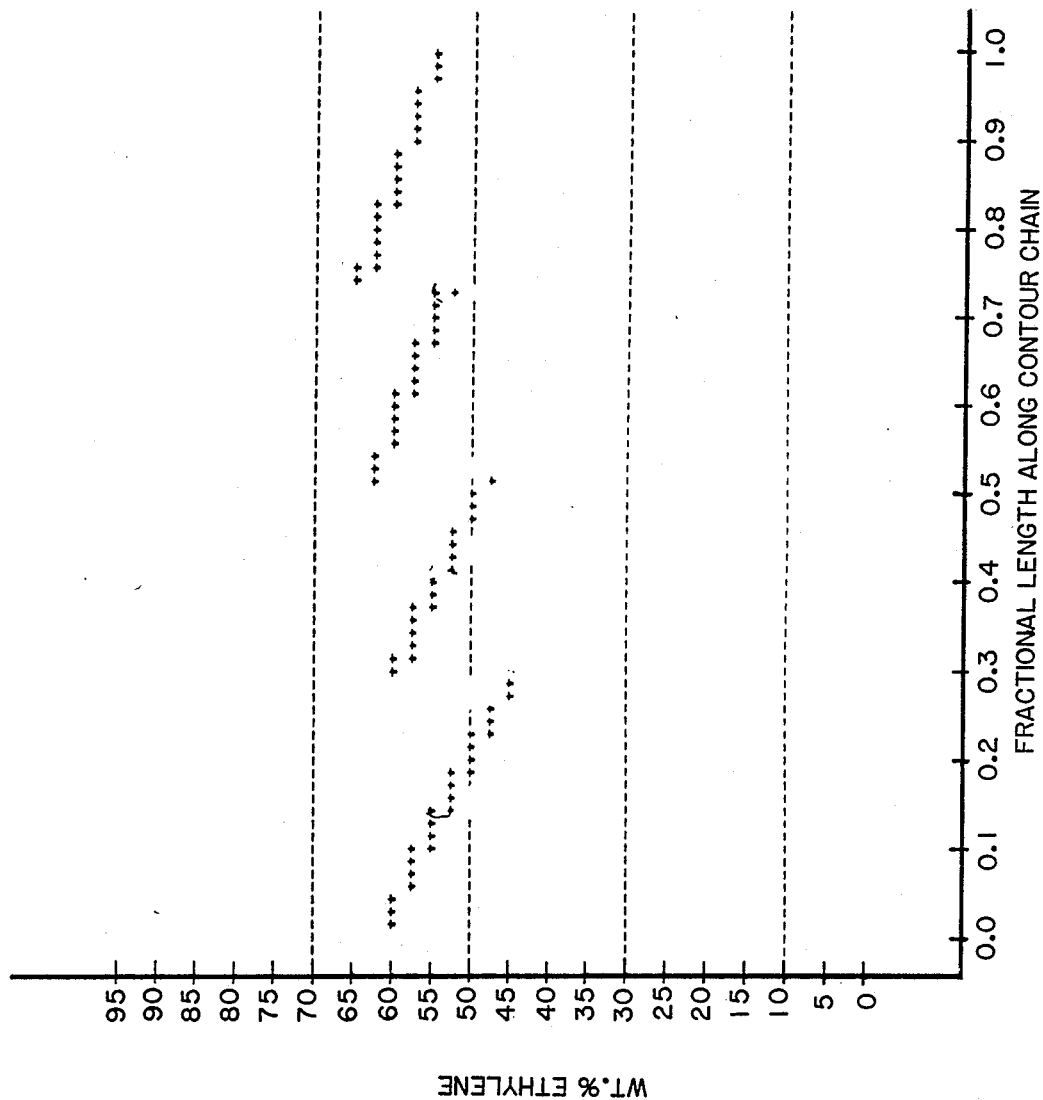
Figure 12:
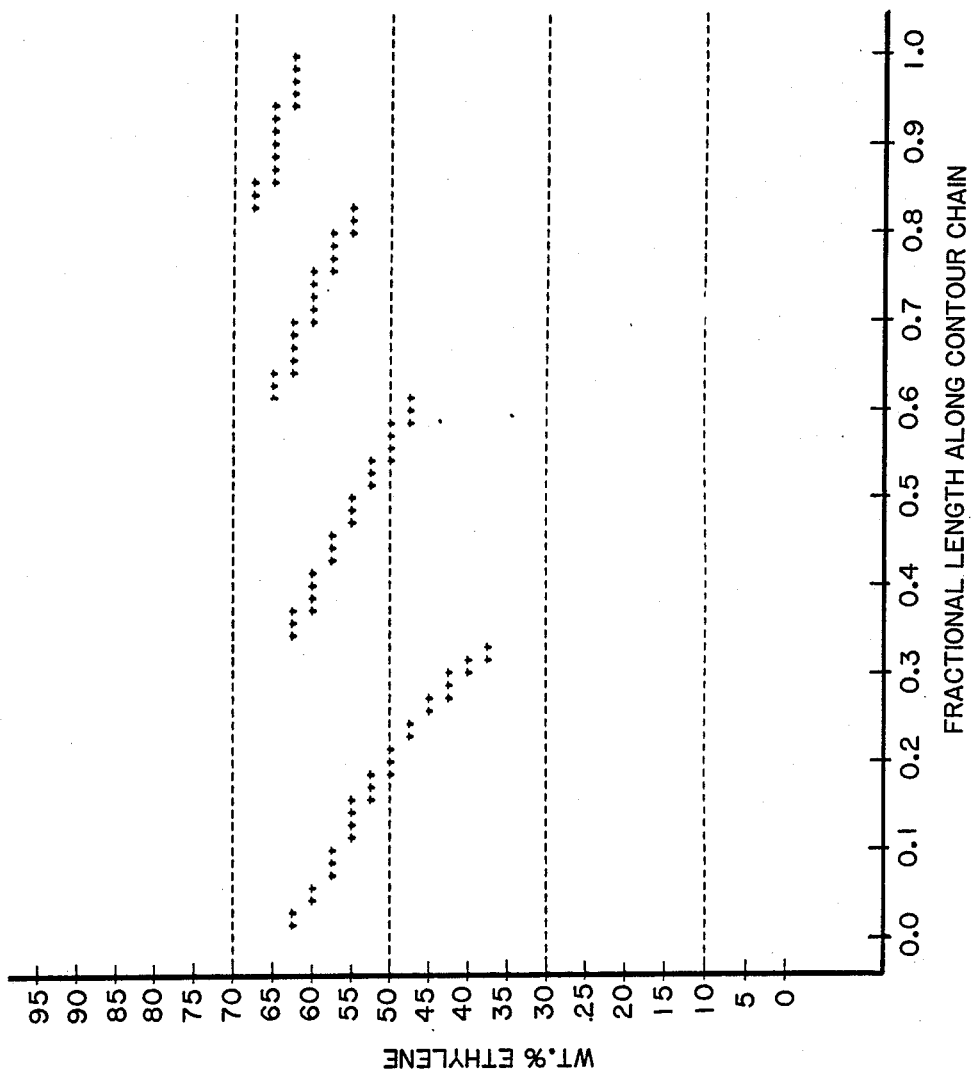
Figure 13:
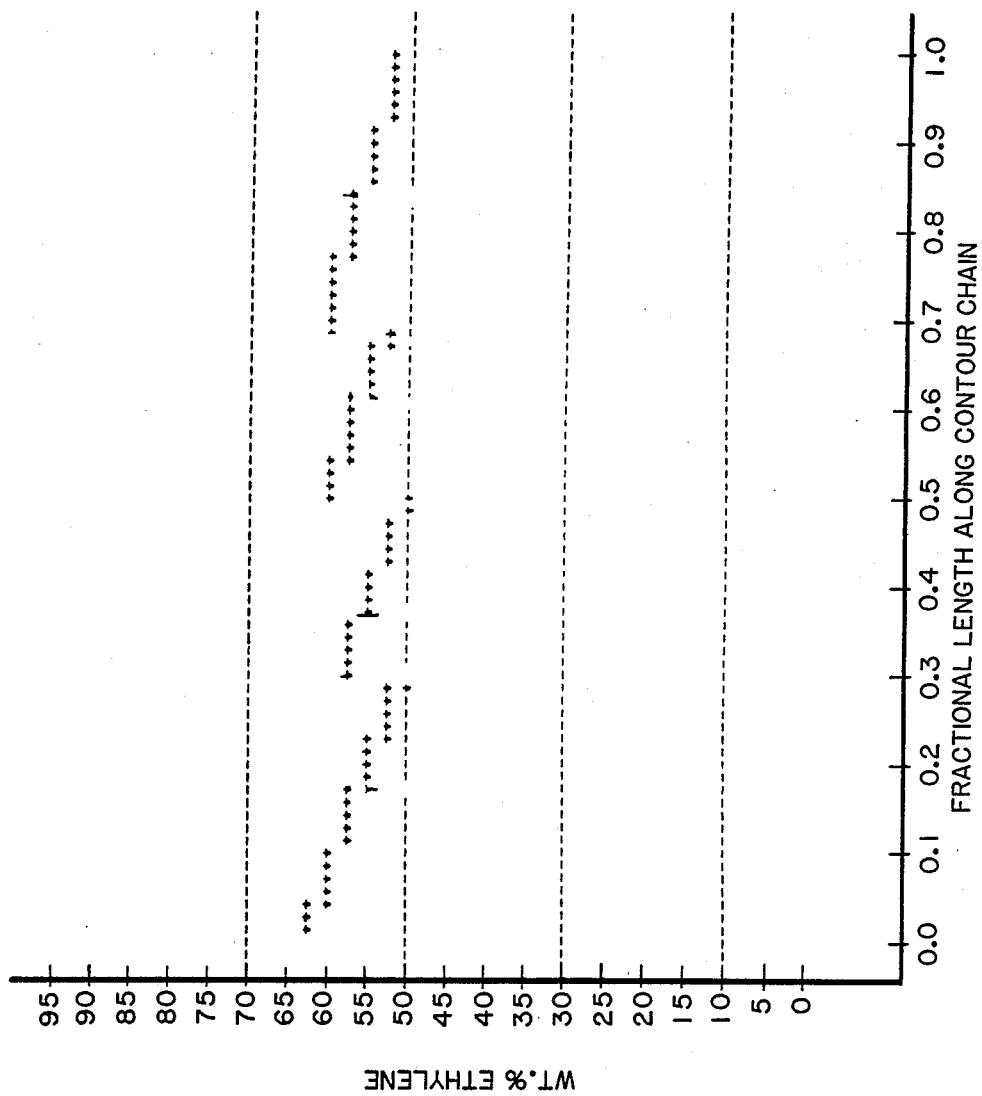
Figure 14:
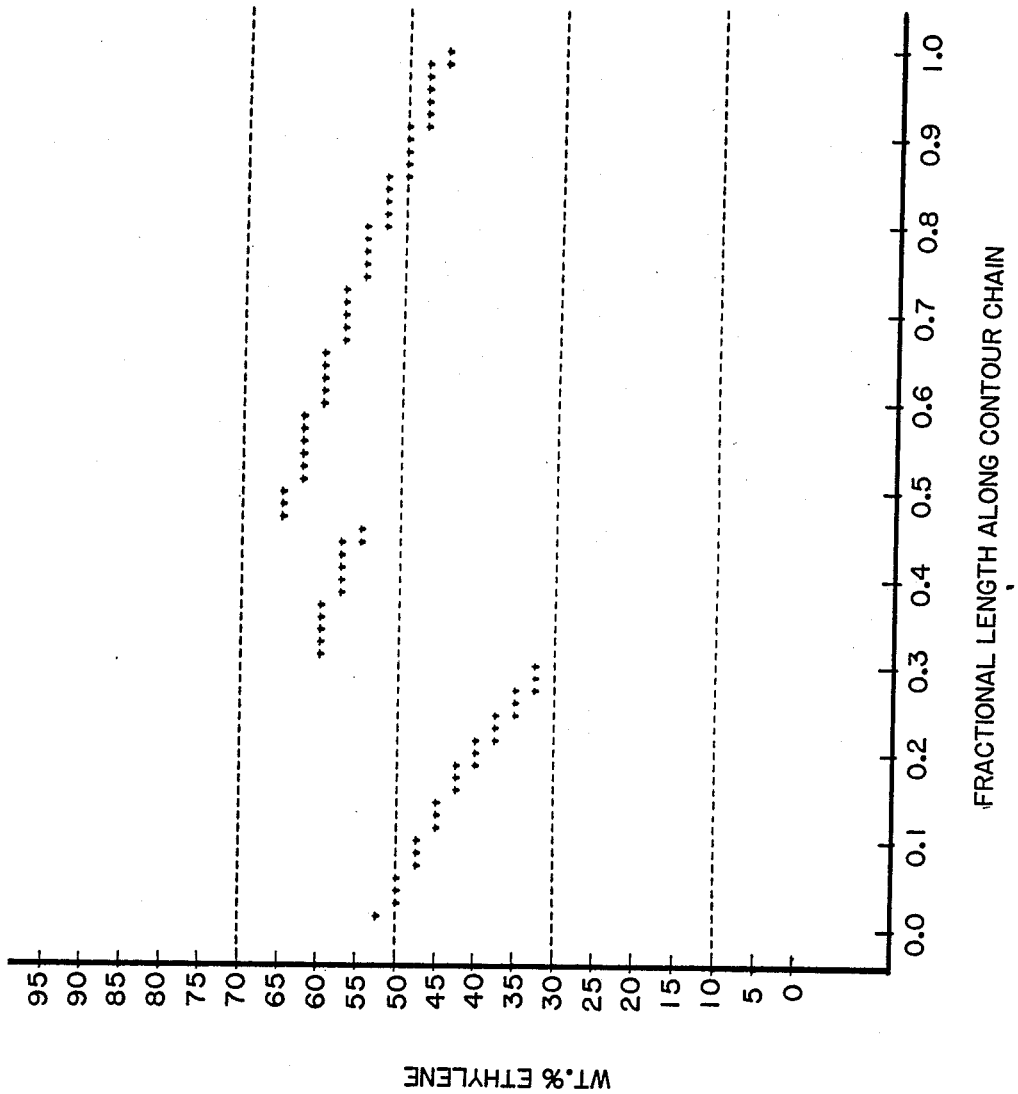
Figure 15:
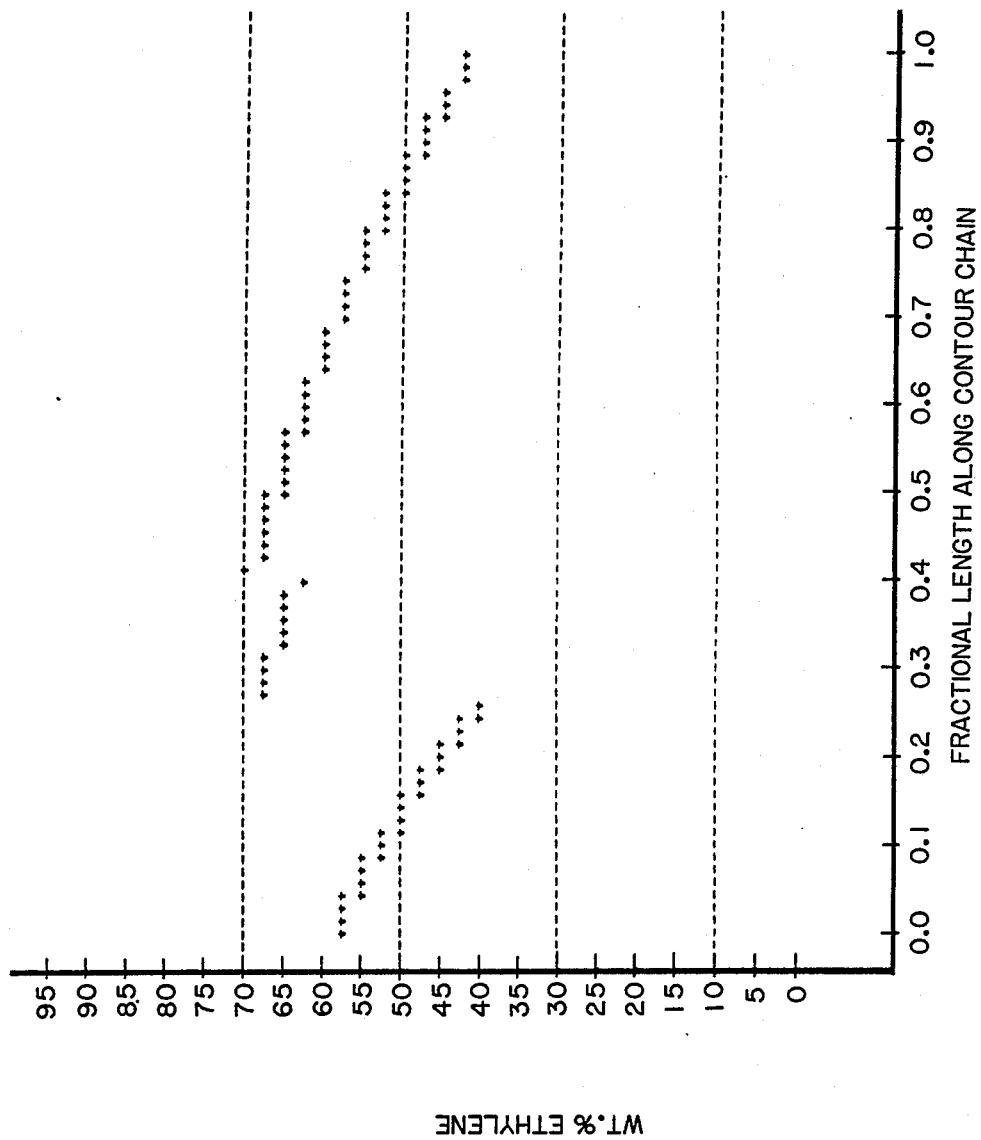

FIG. 5 shows the desirability of having high ethylene content on TE-SSI. FIG. 6 shows the desirability of having high ethylene content on CCS. Thus, if some means can be found to prepare copolymer >50 wt. % ethylene, these TE-SSI and CCS benefits will accrue, if the VE effect can be avoided. A high TE for a given SSI is desirable since the polymer is more effective at thickening the oil than at low TE.

EXAMPLE 3 FOR COMPARISON

This example illustrates the improvement in viscometric properties obtained by preparing a narrow MWD, narrow Intra-CD copolymer in accordance with U.S. Pat. No. 4,540,753.

The polymerization reactor was a 10 meter long, 2.67 cm inside diameter pipe. Monomers, hexane, catalyst, and cocatalyst were continuously fed to the reactor at one end and the copolymer solution and unreacted monomers were withdrawn from the other end. Monomer sidestreams were introduced at selected points along the tubular reactor. Monomers were purified by conventional distillation procedures and reactor temperature was controlled as in Example 1. Reactor pressure was controlled at about 5 bar (gauge) by regulating pressure downstream of catalyst deashing facilities.

A catalyst solution was prepared by dissolving vanadium tetrachloride, 18.5 g. $VCl_4$ in 5 liters of purified n-hexane.

TABLE II

| Run No. | Ethylene wt. % | TE | % KO SSI | CCS; cP at −20° C. | MRV; cP at −25° C. |
|---|---|---|---|---|---|
| 2-1 | 39 | 2.40 | 39.6 | 3520 | 17,200 |
| 2-2 | 41 | 2.27 | 38.9 | 3600 | 18,200 |
| 2-3 | 45.6 | 2.44 | 39.9 | 3400 | 22,300 |
| 2-4 | 50.7 | 2.58 | 39.5 | 3800 | 21,600 |
| 2-5 | 53.1 | 2.69 | 40.4 | 3800 | 18,400 |
| 2-6 | 54.5 | 2.91 | 39.9 | VE | >10⁶ |

TABLE II-continued

| Run No. | Ethylene wt. % | TE | % KO SSI | CCS; cP at −20° C. | MRV; cP at −25° C. |
|---|---|---|---|---|---|
| 2-7 | 61.5 | 2.92 | 40.4 | VE | >10⁶ |
| 2-8 | 66.5 | 3.0 | 32.5 | 2400 | 30,000(YS) |
| 2-9 | 44 | 2.8 | 48 | 3300 | 20,000 |

The cocatalyst consisted of 142 g. of ethyl aluminum sesquichloride, $Al_2Et_3Cl_3$, in 5.0 liters of purified n-hexane. In the case of catalyst premixing, the two solutions were premixed at a given temperature (as indicated in Table IIIA) for 8 seconds prior to entry into the reactor.

Table IIIA lists the feed rates for the monomers, catalyst, and residence times. Polymer was recovered and analyzed as in Example 1.

Compositional distributions were calculated using the reactor temperature profile as described in the specification, and are schematically illustrated in FIGS. 7–13 for Runs 3-1 to 3-7, respectively.

The copolymers were dissolved in the same mineral oil as in Example 1 to again formulate 10W-40 oils. Viscometric properties thereby determined are summarized in Table IIIB below.

and interpolation between their respective TE's shows that the TE at 40% SSI can be increased by approximately 0.2 TE units, due to the narrowing of MWD. Sample 3-7 at 55 wt. % average ethylene shows a similar TE-SSI credit.

With regard to low temperature properties, the narrow MWD and narrow intra-CD show an improvement in CCS performance. Samples 3-5, 3-6 and 3-7 do not exhibit the viscoelastic effect, whereas the conventional technology of Comparative Example 2 (Samples 2-6 and 2-7) did. In general, MRV viscosities are also improved with several passing values. However, none of these Comparative Example 3 samples exhibit passing pour point. The data indicate that to pass the filterability test the average ethylene content must be below 60 to 64 wt. %. It is concluded that homogeneous intra-CD is unacceptable for meeting all performance criteria.

EXAMPLE 4

This example illustrates the improved properties obtained by the novel segmented copolymers of this invention. Using the procedure of Comparative Example 3, and employing the conditions summarized in Table

TABLE IIIA (Ex. 3)

| | Example No. (Sample Code No.) | | | | | | |
|---|---|---|---|---|---|---|---|
| | 3-1 | 3-2 | 3-3 | 3-4 | 3-5 | 3-6 | 3-7 |
| Reactor Inlet Temp. (°C.) | 25 | 25 | 20 | 20 | 21 | 22 | 18 |
| Reactor Outlet Temp. (°C.) | 47 | 45 | 46 | 48.5 | 36 | 47 | 35 |
| Sidestream Feed Temp. (°C.) | 3 | 4 | 14 | 5 | 5 | 5 | 1 |
| Catalyst Premix Temp. (°C.) | 14 | 14 | 13.5 | 12 | 14 | 14 | 13 |
| Catalyst Premix Time (sec.) | 8 | 8 | 8 | 8 | 8 | 8 | 8 |
| Reactor Residence Time (sec.) at | | | | | | | |
| Sidestream 1 | .43 | .43 | .84 | .40 | .85 | .84 | .34 |
| Sidestream 2 | .81 | .81 | 1.53 | .74 | 1.53 | 1.51 | .55 |
| Sidestream 3 | 1.16 | 1.16 | 2.22 | 1.05 | 2.18 | 2.14 | .43 |
| Reactor Res. Time at Quench (sec.) | 2.1 | 2.1 | 4.1 | 1.30 | 3.09 | 3.05 | .99 |
| Inlet Feed Rates (Kg/hr) | | | | | | | |
| Hexane | 2480 | 2437 | 2456 | 2200 | 2400 | 2430 | 2275 |
| Ethylene | 13.2 | 13.2 | 11.2 | 28.8 | 15.5 | 17.6 | 32.4 |
| Propylene | 58.2 | 67.5 | 54 | 230 | 141 | 141 | 262 |
| $VCl_4$ | .19 | .128 | .125 | .125 | .169 | .248 | .31 |
| $Al_2(C_2H_5)_3Cl_3$ | .98 | .66 | .63 | .90 | .87 | 1.27 | 1.6 |
| Sweep Hexane (Kg/hr)[1] | 80 | 83 | 84 | 110 | 100 | 100 | 59 |
| Sidestream Feed Rates (Kg/hr) | | | | | | | |
| Hexane | 440 | 480 | 460 | 710 | 870 | 840 | 900 |
| Ethylene | 30 | 30 | 33.6 | 55 | 32 | 49 | 38.4 |
| Propylene | 30 | 30 | 33.6 | 55 | 32 | 49 | 38.4 |
| Total Hexane (Kg/hr) | 3000 | 3000 | 3000 | 3020 | 3170 | 3170 | 3275 |
| Sidestream Feed Splits (wt. %) | | | | | | | |
| Sidestream 1 | 30 | 30 | 24 | 30 | 30 | 33 | 28 |
| Sidestream 2 | 35 | 35 | 37 | 35 | 35 | 33 | 37 |
| Sidestream 3 | 35 | 35 | 39 | 35 | 35 | 33 | 35 |
| Quench (Kg/hr) - Ethanol | 1.4 | 3 | 3 | 3 | 3 | 3 | 3 |
| $\bar{M}_w$ (× 10³) | 115 | 140 | 165–200 | 185 | 180[2] | 160[2] | 110 |
| $\bar{M}_z/\bar{M}_w$ | 1.15 | 1.15 | 1.2 | 1.15 | — | — | 1.1 |
| $\bar{M}_w/\bar{M}_n$ | 1.2 | 1.25 | 1.4 | 1.35 | — | — | 1.21 |
| Composition (ethylene wt. %) | 65 | 64 | 64 | 60 | 58 | 57 | 61 |
| Crystallinity | 6 | 6 | 4 | 2 | 3 | — | 2 |

$$\left(\frac{\Delta Hf\ cal/g}{69} \times 100\right)^{(3)}$$

Note:
[1]Sweep hexane introduced with catalysts.
[2]Estimated from TE.
[3]Wt. %.

These samples were all prepared at high ethylene (>50 wt. % average ethylene content) where conventional technology failed. The narrow MWD obviously improved the TE-SSI relationship, as can be seen by comparison with FIG. 5. For example, samples 3-2 and 3-3 have the same average ethylene content, 64 wt. %, IVA, a series of copolymers were prepared. The polymers were recovered and analyzed as in Comparative Example 1. The copolymer chain contours are illustrated for Runs 4-1 and 4-2 in FIGS. 14 and 15, respectively. Each copolymer was then dissolved in the basestock-pour depressant mixture described in Example 1. The resulting lube oil compositions were tested, and the data thereby obtained is set forth in Table IVB.

TABLE IIIB[1]

| Run No. | Wt. % Ethylene | TE | CCS (cP) | MRV (cP) | Pour Point (°C.) | Filterability | SSI |
|---|---|---|---|---|---|---|---|
| 3-1 | 65 | 2.7 | 2400 | 10,000 | −28.9 | Fail | 26 |
| 3-2 | 64 | 3.2 | 2400 | 10,500 | −26.1 | Fail | 37 |
| 3-3 | 64 | 3.8 | 2450 | 8,600 | −26.1 | Fail | 48 |
| 3-4 | 60 | 3.9 | VE | 30,000 | −26 | Pass | 61 |
| 3-5 | 58 | 3.8 | 2300 | 43,000 | −12 | Pass | 58 |
| 3-6 | 57 | 3.4 | 2500 | 12,000 | −20 | Pass | 57 |
| 3-7 | 55 | 2.7 | VE | 47,000[2] (YS > 140 Pa) | −20 | — | 31 |

[1]All in Exxon basestock as in Example 1.
[2]TPI cycle.

and MRV are acceptable, as they were for several of the homogeneous samples of Comparative Example 3. However, now pour points are acceptable and polymers with acceptable pour point and filterability are obtained (Samples 4-1 and 4-2). The crystallizable "M" segment produces low viscosity while the noncrystallizable "T" segments inhibit the formation of gels which give high pour points, high viscosity or yield stress in MRV and poor filterability.

EXAMPLE 5

This example illustrates the preparation of copolymers containing one M segment and one T segment. The procedure of Comparative Example 3 was repeated, employing the conditions set forth in Table IVA. The resulting lube oil compositions yielded data set forth in Table V.

TABLE V

TABLE IVA

| | (Ex. 4) | | | |
|---|---|---|---|---|
| | Example No. (Sample Code No.) | | | |
| | 4-1 | 4-2[3] | 5-1 | 6-1 |
| Reactor Inlet Temp. (°C.) | 19.5 | −36.7 | 22 | 5 |
| Reactor Outlet Temp. (°C.) | 46 | 12.8 | 27 | 44 |
| Sidestream Feed Temp. (°C.) | 5 | −31.7 | 4 | 6 |
| Catalyst Premix Temp. (°C.) | 14.5 | 15.6 | 15 | 15 |
| Catalyst Premix Time (sec.) | 8 | 8 | 8 | 8 |
| Reactor Residence Time (sec.) at | | | | |
| Sidestream 1 | .68 | 1.27 | .67 | 1.7 |
| Sidestream 2 | .84 | 1.41 | — | — |
| Reactor Res. Time at Quench (sec.) | 2.2 | 2.5 | 14.3 | 2.1 |
| Inlet Feed Rates (Kg/hr) | | | | |
| Hexane | 1828 | 165 | 2710 | 2100 |
| Ethylene | 18 | 1.16 | 17.3 | 37 |
| Propylene | 270 | 17.5 | 86.4 | 280 |
| VCl$_4$ | .288 | .020 | .13 | .29 |
| Al$_2$(C$_2$H$_5$)$_3$Cl$_3$ | 1.24 | .522 | .65 | 1.49 |
| Sweep Hexane (Kg/hr)[1] | 102 | 5.6 | 103 | 116 |
| Sidestream Feed Rates (Kg/hr)[2] | | | | |
| Hexane | 1092 | 27 | 355 | 1000 |
| Ethylene | 49.2 | 3.1 | 3.5 | 44 |
| Propylene | 49.2 | 4.9 | 110 | 44 |
| Total Hexane (Kg/hr) | 3020 | 192 | 3170 | 3100 |
| Sidestream Feed Splits (wt. %) | | | | |
| Sidestream 1 | 60 | 71 | 100 | 100 |
| Sidestream 2 | 40 | 29 | — | — |
| $\overline{M}_w$ (× 10$^3$) | 180 | 170 | 165 | 160 |
| $\overline{M}_z/\overline{M}_w$ | 1.2 | 1.1 | — | 1.25 |
| $\overline{M}_w/\overline{M}_n$ | 1.5 | 1.15 | — | 1.45 |
| Composition (ethylene wt. %) | 53 | 55 | 53 | 55 |
| Quench (Kg/hr) | | | | |
| Ethanol | 4.5 | 102 | — | 3 |
| H$_2$O | — | — | 14.3 | — |
| Crystallinity (%) | 2 | 1 | 2[4] | 2[4] |

$$\left( \frac{\Delta H_f \text{ cal/g.}}{69} \times 100 \right)$$

Notes:
[1]Sweep hexane introduced with catalysts.
[2]Total of equal sidestream flows, except where indicated.
[3]Made in 5" reactor, feed rates in k lb/hr.
[4]These samples were observed to possess room temperature rigidity, indicating the samples contained some crystallinity. ΔH$_f$ was not measured.

TABLE IVB

| Run No. | Ethylene Wt. % | TE | CCS (cP) | MRV (cP) | Pour Point (°C.) | Filterability | SSI |
|---|---|---|---|---|---|---|---|
| 4-1 | 53 | 3.6 | 2750 | 10,000 | −34.4 | Pass | 52 |
| 4-2 | 55 | 3.6 | 2750 | 12,000 | −35.3 | pass | 48 |

| Run No | Ethylene Wt. % | TE | CCS (cP) | MRV (cP) | Pour Point (°C.) | Filterability | SSI |
|---|---|---|---|---|---|---|---|
| 5-1 | 53 | 3.3 | 2900 | 12,000 | −31.7 | Pass | 54 |

These samples with the T—M—T segment distribution yield an improved balance of all properties. CCS The copolymer in this example (whose chain contour is illustrated in FIG. 16) also clearly provides improved viscometric properties compared to the copolymers in Comparative Example 1, in a completely similar manner to Example 4. This M-T segmental polymer shows improved properties over the conventional technology of Comparative Examples 1 and 2, and the homogeneous, narrow MWD polymers of Comparative Example 3.

EXAMPLE 6

In this example a segmented structure such as Example 4 is prepared except that the high and low portions of the chain are exchanged, so that the ends are high ethylene and the center is low. (Conditions for this polymer's preparation are set out in Table IVA above.) This corresponds to a M—T—M structure (Structure IV, as explained above). The average composition is the same as Example 4-1, 53 wt. % ethylene. This copolymer's chain contour is illustrated in FIG. 17.

The copolymer was dissolved in the basestock pour depressant mixture described in Example 1. Results are tabulated in Table VII below:

TABLE VII

| Run No. | Ethylene Wt. % | TE | CCS (cP) | MRV (cP) | MRV Yield Stress (Pa.) | Pour Point °C. |
|---|---|---|---|---|---|---|
| 8-1 | 53 | 3.25 | 2780 | 29,000 | 140 | −32 |

This polymer is unacceptable as a commercial viscosity modifier because it exhibits a measureable yield stress in the MRV, as well as high MRV viscosity. The two crystallizable sections on the polymer molecules permit the formation of a weak network in the MRV at low temperatures which is solid-like, capable of supporting a finite stress before flow is established (the so-called yield stress), above which stress the network is broken and the oil is again fluid although with a much higher viscosity than Example 4-1.

The copolymers of the present invention are also useful in automotive and industrial mechanical goods applications, due to their outstanding resistance to weathering, good heat aging properties and the ability to be compounded with large quantities of fillers and plasticizers, resulting in low cost compounds Therefore, the polymers of this invention can be cross-linked with peroxide initiators or with radiation to yield polymer networks which, due to their narrow MWD have good performance properties Typical automotive uses are tire sidewalls, inner tubes, radiator and heater hose, vacuum tubing, weather stripping and sponge doorseals. Typical mechanical goods uses are for appliance, industrial and garden hoses both molded and extruded sponge parts, gaskets and seals and conveyor belt covers. These copolymers are also useful in adhesives, appliance parts as in hoses and gaskets, wire and cable and plastics blending.

From the foregoing description, one skilled in the art can easily ascertain the essential characteristics of this invention and, without departing from the spirit and scope thereof, make various changes and modifications of the invention to adapt it to various usages and conditions.

What is claimed is:

1. A lubricating oil composition comprising a major amount of lubricating oil; a viscosity modifying effective amount of viscosity modifier comprising copolymer of ethylene and at least one other alpha-olefin monomer, wherein said copolymer has a molecular weight distribution characterized by at least one of a ratio of $\overline{M}_w/\overline{M}_n$ of less than 2 and a ratio of $\overline{M}_z/\overline{M}_w$ of leas than 1.8, and wherein said compolymer comprises intramolecularly heterogeneous polymeric chains containing at least one crystallizable segment of methylene units and at least one low crystallinity ethylene-alpha-olefin copolymer segment, wherein said at least one crystallizable segment comprises at least about 10 weight percent of said copolymer chain and contains an average ethylene content of at least about 57 weight percent, and wherein said low crystallinity segment contains an average ethylene content of from about 20 to 53 weight percent, and wherein at least two portions of an individual intramolecularly heterogeneous chain, each portion comprising at least 5 weight percent of said chain, differ in composition from one another by at least 7 weight percent ethylene; and ashless dispersant.

2. The lubricating oil composition according to claim 1 wherein said ashless dispersant is selected from the group consisting of polyalkenyl succinimides, polyesters of hydrocarbon substituted succinic anhydride, oxazoline or lactone oxazoline dispersants derived from hydrocarbon substituted succinic anhydride and di-substituted amino alcohols, long chain aliphatic hydrocarbons having a polyamine attached directly thereto, Mannich condensation products formed by condensing long chain hydrocarbon substituted phenol with formaldehyde and polyalkylene polyamine, and mixtures thereof.

3. The lubricating oil composition according to claim 2 wherein said ashless dispersant is polyalkenyl succinimide.

4. The lubricating oil composition according to claim 3 wherein said polyalkenyl group of said polyalkenyl succinimide is derived from a $C_1$–$C_{10}$ olefin.

5. The lubricating oil composition according to claim 4 wherein said polyalkenyl group is polyisobutenyl.

6. The lubricating oil composition according to claim 2 wherein said polyisobutenyl has a number average molecular weight of about 700 to 5,000.

7. The lubricating oil composition according to claim 3 wherein said polyalkenyl succinimide is borated.

8. The lubricating oil composition according to claim 5 wherein said polyisobutenyl succinimide is borated.

9. The lubricating oil composition according to claim 6 wherein said polyisobutenyl succinimide is borated.

10. The lubricating oil composition according to claim 2 wherein said ashless dispersant is selected form the group consisting of oxazoline and lactone oxazoline dispersants derived from hydrocarbon substituted succinic anhydride and di-substituted amino alcohols.

11. The lubricating oil composition according to claim 2 wherein said ashless dispersant is long chain aliphatic hydrocarbon having a polyamine attached thereto.

12. The lubricating oil composition according to claim 2 wherein said ashless dispersant is Mannich condensation product formed by condensing long chain hydrocarbon-substituted phenol with formaldehyde and polyalkylene polyamine, wherein said long chain hydrocarbon is a polymer of a $C_2$ to $C_{10}$ monoolefin and has a number average molecular weight of from about 700 to 5,000.

13. The lubricating oil composition according to claim 1 containing from about 0.5 to 8 wt % of said ashless dispersant.

14. The lubricating oil composition according to claim 1 wherein said copolymer has a total maximum ethylene content of about 90% on a weight basis.

15. The lubricating oil composition according to claim 14 wherein said copolymer has a molecular weight distribution characterized by at least one of a ratio of $\overline{M}_w/\overline{M}_n$ of lest than about 1.5 and a ratio of $\overline{M}_z/\overline{M}_w$ of less than about 1.5.

16. The lubricating oil composition according to claim 14 wherein said copolymer has a molecular weight distribution characterized by at least one of a ratio of $\overline{M}_w/\overline{M}_n$ of less than about 1.25 and a ratio of $\overline{M}_z/\overline{M}_w$ of less than about 1.2.

17. The lubricating oil composition according to claim 14 wherein said copolymer has an intermolecular compositional dispersity such that 95 weight percent of said copolymer chains have a composition 15 weight percent or less different from the average ethylene composition of said copolymer.

18. The lubricating oil composition according to claim 13 wherein said intermolecular compositional dispersity of said copolymer is such that 95 weight percent of said copolymer chains have a compositional 10 wt % or less different from said average ethylene composition.

19. The lubricating oil composition according to claim 1 containing from about 0.001 to 49 wt. % of said copolymer.

20. The lubricating oil composition according to claim 1, wherein said copolymer has a weight-average molecular weight of about 50,000 to 500,000.

21. The lubricating oil composition according to claim 1 wherein said copolymer has a molecular weight distribution characterized by at least one of a ratio of $\overline{M}_w/\overline{M}_n$ of less than about 1.5 and a ratio of $\overline{M}_z/\overline{M}_w$ of less than about 1.5, and wherein said copolymer has an intermolecular compositional dispersity such that 95 weight percent of said copolymer chains have a composition 13 wt. % or less different from said average ethylene composition.

22. The lubricating oil composition according to claim 21 wherein said intermolecular compositional dispersity is such that 95 weight percent of said copolymer chains have a composition 13 wt. % or less different from said average ethylene composition.

23. The lubricating oil composition according to claim 22 wherein said copolymer has a MWD molecular weight distribution characterized by at least one of a ratio of $\overline{M}_w/\overline{M}_n$ of less than about 1.25 and a ratio of $\overline{M}_z/\overline{M}_w$ of less than about 1.2, and wherein said copolymer has an intermolecular compositional dispersity such that 95 weight percent of said copolymer chains have a composition 10 wt. % or less different from said average ethylene composition.

24. The lubricating oil composition according to claim 23 wherein said intermolecular compositional dispersity is such that 95 weight percent of said copolymer chains have a composition 10 wt. % or less different from said average ethylene composition.

25. The lubricating oil composition according to claim 24, wherein said weight-average molecular weight is less than about 300,000.

26. The lubricating oil composition according to claim 25, wherein said weight-average molecular weight is less than about 250,000.

27. The lubricating oil composition according to claim 1 wherein said copolymer comprises ethylene and propylene.

28. The lubricating oil composition according to claim 27 wherein said copolymer further comprises diene.

29. The lubricating oil composition according to claim 28 wherein said diene is 5-ethylidene-2-norbornene.

30. The lubricating oil composition according to claim 1 having an Mini Rotary Viscometer viscosity of less than 30,000 cP at the maximum SAE borderline pumping temperature for the oil.

31. The lubricating oil composition according to claim 1 having an Mini Rotary Viscometer viscosity of less than 20,000 cP at the maximum SAE borderline pumping temperature for the oil.

32. The lubricating oil composition according to claim 1 having an Mini Rotary Viscometer viscosity of less than 10,000 cP at the maximum SAE borderline pumping temperature for the oil.

33. The lubricating oil composition according to claim 1 which further contains at least one other viscosity modifier different from said copolymer.

34. The lubricating oil composition according to claim 33 wherein said second viscosity modifier is selected from the group consisting of olefin polymers, hydrogenated polymers of isoprene or butadiene, hydrogenated copolymers of styrene with isoprene, copolymers of styrene with butadiene, terpolymers of styrene with isoprene and butadiene, polymers of alkyl acrylates, polymers of alkyl methacrylates, copolymers of alkyl methacrylates with N-vinyl pyrrolidone, copolymers of alkyl methacrylates with dimethylaminoalkyl methacrylate, polymers of ethylene-propylene grafted with maleic anhydride and further reacted with alkylene polyamine, polymers of ethylene-propylene grafted with maleic anhydride and further reacted with alcohol, polymers of ethylene-propylene grafted with maleic anhydride, styrene-maleic anhydride polymers reacted with alcohol, styrene-maleic anhydride reacted with amine, ethylene-propylene copolymers grafted with N-vinyl pyrrolidone, 2-vinyl pyridine, and mixtures thereof.

35. The lubricating oil composition according to claim 5 wherein said copolymer has a total maximum ethylene content of about 90% on a weight basis.

36. The lubricating oil composition according to claim 35 wherein said copolymer has a molecular weight distribution characterized by at least one of a ratio of $\overline{M}_w/\overline{M}_n$ of less than about 1.5 and a ratio of $\overline{M}_z/\overline{M}_w$ of less than about 1.5.

37. The lubricating oil composition according to claim 36 wherein said copolymer has a molecular weight distribution characterized by at least one of a ratio of $\overline{M}_w/\overline{M}_n$ of less than about 1.25 and a ratio of $\overline{M}_z/\overline{M}_w$ of less than about 1.2.

38. The lubricating oil composition according to claim 36 wherein said copolymer has an intermolecular compositional dispersity such that 95 weight percent of said copolymer chains have a composition 15 weight percent or less different from the average ethylene composition of said copolymer.

39. The lubricating oil composition according to claim 38 wherein said intermolecular compositional dispersity of said copolymer is such that 95 weight percent of said copolymer chains have a compositional 10 wt % or less different from said average ethylene composition.

40. The lubricating oil composition according to claim 5 wherein said copolymer comprises ethylene and propylene.

41. The lubricating oil composition according to claim 40 wherein said copolymer further comprises diene.

42. The lubricating oil composition according to claim 41 wherein said diene is 5-ethylidene-2-norbornene.

43. The lubricating oil composition according to claim 8 wherein said compolymer has a total maximum ethylene content about 90% on a weight basis.

44. The lubricating oil composition according to claim 43 wherein said copolymer has a molecular weight distribution characterized by at least one of a ratio of $\overline{M}_w/\overline{M}_n$ of less than about 1.5 and a ratio of $\overline{M}_z/\overline{M}_w$ of less than about 1.5.

45. The lubricating oil composition according to claim 44 wherein said copolymer has a molecular weight distribution characterized by at least one of a ratio of $\overline{M}_w/\overline{M}_n$ of less than about 1.25 and a ratio of $\overline{M}_z/\overline{M}_w$ of less than about 1.2.

46. The lubricating oil composition according to claim 44 wherein said copolymer has an intermolecular compositional dispersity such that 95 weight percent of said copolymer chains have a composition 15 weight percent or less different from the average ethylene composition of said copolymer.

47. The lubricating oil composition according to claim 46 wherein said intermolecular compositional dispersity of said copolymer is such that 95 weight percent of said copolymer chains have a compositional 10 wt % or less different from said average ethylene composition.

48. The lubricating oil composition according to claim 34 wherein said copolymer has a total maximum ethylene content of about 90% on a weight basis and a molecular weight distribution characterized by at least one of a ratio of $\overline{M}_w/\overline{M}_n$ of less than about 1.5 and a ratio of $\overline{M}_z/\overline{M}_w$ of less than about 1.5.

49. The lubricating oil composition according to claim 48 wherein said copolymer has a molecular weight distribution characterized by at least one of a ratio of $\overline{M}_w/\overline{M}_n$ of less than about 1.25 and a ratio of $\overline{M}_z/\overline{M}_w$ of less than about 1.2.

50. The lubricating oil composition according to claim 48 wherein said copolymer has an intermolecular compositional dispersity such that 95 weight percent of said copolymer chains have a composition 15 weight percent or less different from the average ethylene composition of said copolymer.

51. The lubricating oil composition according to claim 50 wherein said intermolecular compositional dispersity of said copolymer is such that 95 weight percent of said copolymer chains have a compositional 10 wt % or less different from said average ethylene composition.

52. A lubricating oil composition comprising a major amount of lubricating oil and a viscosity modifying effective amount of viscosity modifier comprising (i) copolymer of ethylene and at least one other alpha-olefin monomer, wherein said compolymer has a molecular weight distribution characterized by at least one of a ratio of $\overline{M}_w/\overline{M}_n$ of less than 2 and a ratio of $\overline{M}_z/\overline{M}_w$ of leas than 1.8, and wherein said compolymer comprises intramolecularly heterogeneous polymeric chains containing at least one crystallizable segment of methylene units and at least one low crystallinity ethylene-alpha-olefin copolymer segment, wherein said at least one crystallizable segment comprises at least about 10 weight percent of said copolymer chain and contains an average ethylene content of at least about 57 weight percent, and wherein said low crystallinity segment contains an average ethylene content of from about 20 to 53 weight percent, and wherein at least two portions of an individual intramolecularly heterogeneous chain, each portion comprising at least 5 weight percent of said chain, differ in composition from one another by at least 7 weight percent ethylene, and (ii) at least one other viscosity modifier different from said copolymer (i).

53. The lubricating oil composition according to claim 52 wherein said second viscosity modifier (ii) is selected from the group consisting of olefin polymers, hydrogenated polymers of isoprene or butadiene, hydrogenated copolymers of styrene with isoprene, copolymers of styrene with butadiene, terpolymers of styrene with isoprene and butadiene, polymers of alkyl acrylates, polymers of alkyl methacrylates, copolymers of alkyl methacrylates with N-vinyl pyrrolidone, copolymers of alkyl methacrylates with dimethylaminoalkyl methacrylate, polymers of ethylene-propylene grafted with maleic anhydride and further reacted with alkylene polyamine, polymers of ethylene-propylene grafted with maleic anhydride and further reacted with alcohol, polymers of ethylene-propylene grafted with maleic anhydride, styrene-maleic anhydride polymers reacted with alcohol, styrene-maleic anhydride reacted with amine, ethylene-propylene copolymers grafted with N-vinyl pyrrolidone, 2-vinyl pyridine, and mixtures thereof.

54. The lubricating oil composition according to claim 52 wherein said copolymer (i) has a total maximum ethylene content of about 90% on a weight basis.

55. The lubricating oil composition according to claim 54 wherein said copolymer (i) has a molecular weight distribution characterized by at least one of a ratio of $\overline{M}_w/\overline{M}_n$ of lest than about 1.5 and a ratio of $\overline{M}_z/\overline{M}_w$ of less than about 1.5.

56. The lubricating oil composition according to claim 55 wherein said copolymer (i) has a molecular weight distribution characterized by at least one of a ratio of $\overline{M}_w/\overline{M}_n$ of less than about 1.25 and a ratio of $\overline{M}_z/\overline{M}_w$ of less than about 1.2.

57. The lubricating oil composition according to claim 55 wherein said copolymer (i) has an intermolecular compositional dispersity such that 95 weight percent of said copolymer chains have a composition 15 weight percent or less different from the average ethylene composition of said copolymer.

58. The lubricating oil composition according to claim 57 wherein said intermolecular compositional dispersity of said copolymer (i) is such that 95 weight percent of said copolymer chains have a compositional 10 wt % or less different from the average ethylene composition.

59. The lubricating oil composition according to claim 52 containing from about 0.001 to 49 wt. % of said copolymer (i).

60. The lubricating oil composition according to claim 52, wherein said copolymer (i) has a weight-average molecular weight of about 50,000 to 500,000.

61. The lubricating oil composition according to claim 52 wherein said copolymer (i) has a molecular weight distribution characterized by at least one of a ratio of $\overline{M}_w/\overline{M}_n$ of less than about 1.5 and a ratio of $\overline{M}_z/\overline{M}_w$ of less than about 1.5, and wherein said copolymer has an intermolecular compositional dispersity such that 95 weight percent of said copolymer chains have a composition 13 wt. % or less different from said average ethylene composition.

62. The lubricating oil composition according to claim 61 wherein said intermolecular compositional dispersity is such that 95 weight percent of said copolymer (i) chains have a composition 13 wt % or less different from said average ethylene composition.

63. The lubricating oil composition according to claim 62 wherein said copolymer (i) has a molecular weight distribution characterized by at least one of a ratio of $\overline{M}_w/\overline{M}_n$ of less than about 1.25 and a ratio of $\overline{M}_z/\overline{M}_w$ of less than about 1.2, and wherein said copolymer has an intermolecular compositional dispersity such that 95 weight percent of said copolymer chains have a composition 10 wt. % or less different from said average ethylene composition.

64. The lubricating oil composition according to claim 63 wherein said intermolecular compositional dispersity is such that 95 weight percent of said copolymer (i) chains have a composition 10 wt. % or less different from said average ethylene composition.

65. The lubricating oil composition according to claim 64, wherein said weight-average molecular weight of said copolymer (i) is less than about 300,000.

66. The lubricating oil composition according to claim 65, wherein said weight-average molecular weight of said copolymer (i) is less than about 250,000.

67. The lubricating oil composition according to claim 52 wherein said copolymer (i) comprises ethylene and propylene.

68. The lubricating oil composition according to claim 67 wherein said copolymer further comprises diene.

69. The lubricating oil composition according to claim 68 wherein said diene is 5-ethylidene-2-norbornene.

70. The lubricating oil composition according to claim 54 having an Mini Rotary Viscometer viscosity of less than 30,000 cP at the maximum SAE borderline pumping temperature for the oil.

71. The lubricating oil composition according to claim 52 having an Mini Rotary Viscometer viscosity of less than 20,000 cP at the maximum SAE borderline pumping temperature for the oil.

72. The lubricating oil composition according to claim 52 having an Mini Rotary Viscometer viscosity of less than 10,000 cP at the maximum SAE borderline pumping temperature for the oil.

73. The lubricating oil composition according to claim 53 wherein said copolymer (i) has a total maximum ethylene content of about 90% on a weight basis.

74. The lubricating oil composition according to claim 73 wherein said copolymer (i) has a molecular weight distribution characterized by at least one of a ratio of $\overline{M}_w/\overline{M}_n$ of less than about 1.5 and a ratio of $\overline{M}_z/\overline{M}_w$ of less than about 1.5.

75. The lubricating oil composition according to claim 74 wherein said copolymer (i) has a molecular weight distribution characterized by at least one of a ratio of $\overline{M}_w/\overline{M}_n$ of less than about 1.25 and a ratio of $\overline{M}_z/\overline{M}_w$ of less than about 1.2.

76. The lubricating oil composition according to claim 73 wherein said copolymer (i) has an intermolecular compositional dispersity such that 95 weight percent of said copolymer chains have a composition 15 weight percent or less different from the average ethylene composition of said copolymer.

77. The lubricating oil composition according to claim 76 wherein said intermolecular compositional dispersity of said copolymer (i) is such that 95 weight percent of said copolymer chains have a compositional 10 wt % or less different from said average ethylene composition.

78. The lubricating oil composition according to claim 53 containing from about 0.001 to 49 wt. % of said copolymer (i).

79. The lubricating oil composition according to claim 53, wherein said copolymer (i) has a weight-average molecular weight of about 50,000 to 500,000.

80. The lubricating oil composition according to claim 53 wherein said copolymer (i) has a molecular weight distribution characterized by at least one of a ratio of $\overline{M}_w/\overline{M}_n$ of less than about 1.5 and a ratio of $\overline{M}_z/\overline{M}_w$ of less than about 1.5, and wherein said copolymer has an intermolecular compositional dispersity such that 95 weight percent of said copolymer chains have a composition 13 wt. % or less different from said average ethylene composition.

81. The lubricating oil composition according to claim 80 wherein said intermolecular compositional dispersity is such that 95 weight percent of said copolymer (i) chains have a compostion 13 wt. % or less different from said average ethylene composition.

82. The lubricating oil composition according to claim 81 wherein said copolymer (i) has a molecular weight distribution characterized by at least one of a ratio of $\overline{M}_w/\overline{M}_n$ of less than about 1.25 and a ratio of $\overline{M}_z/\overline{M}_w$ of less than about 1.2, and wherein said copolymer has an intermolecular compositional dispersity such that 95 weight percent of said copolymer chains have a composition 10 wt. % or less different from said average ethylene composition.

83. The lubricating oil composition according to claim 82 wherein said intermolecular compositional dispersity is such that 95 weight percent of said copolymer (i) chains have a compostion 10 wt. % or less different from said average ethylene composition.

84. The lubricating oil composition according to claim 83, wherein said weight-average molecular weight of said copolymer (i) is less than about 300,000.

85. The lubricating oil composition according to claim 84, wherein said weight-average molecular weight of said copolymer (i) is less than about 250,000.

86. The lubricating oil compostion according to claim 53 wherein said copolymer (i) comprises ethylene and propylene.

87. The lubricating oil compostion according to claim 86 wherein said copolymer (i) further comprises diene.

88. The lubricating oil composition according to claim 87 wherein said diene is 5-ethylidene-2-norbornene.

89. The lubricating oil composition according to claim 53 wherein said other viscosity modifier (ii) is selected from the group consisting of polymers of ethylene-propylene grafted with maleic anhydride and further reacted with alkylene polyamine, polymers of ethylene-propylene grafted with maleic anhydride and further reacted with alcohol, ethylene-propylene copolymers grafted with N-vinyl pyrrolidone or 2-vinyl pyridine, and mixtures thereof.

90. The lubricating oil composition according to claim 1 which contains a dispersant effective amount of said ashless dispersant.

* * * * *